US012610358B2

(12) United States Patent
Zhang et al.

(10) Patent No.: US 12,610,358 B2
(45) Date of Patent: Apr. 21, 2026

(54) SYSTEMS AND METHODS FOR REDUCING TRANSMISSION DATA COLLISION FOR DUAL SUBSCRIBER DUAL ACTIVE DEVICES

(71) Applicant: APPLE INC., Cupertino, CA (US)

(72) Inventors: Lijie Zhang, Beijing (CN); Alex Yee Kit Ho, Cupertino, CA (US); Bing Zhao, Beijing (CN); Kexin Ma, San Diego, CA (US); Qiang Miao, Beijing (CN); Tao Huang, Beijing (CN); Wen Zhao, Cupertino, CA (US); Yanxia Wang, Beijing (CN); Ying Zhang, Beijing (CN); Zhiwei Wang, Beijing (CN)

(73) Assignee: APPLE INC., Cupertino, CA (US)

( * ) Notice: Subject to any disclaimer, the term of this patent is extended or adjusted under 35 U.S.C. 154(b) by 895 days.

(21) Appl. No.: 17/758,609

(22) PCT Filed: Aug. 27, 2021

(86) PCT No.: PCT/CN2021/115030
§ 371 (c)(1),
(2) Date: Jul. 11, 2022

(87) PCT Pub. No.: WO2023/024077
PCT Pub. Date: Mar. 2, 2023

(65) Prior Publication Data
US 2024/0188067 A1    Jun. 6, 2024

(51) Int. Cl.
*H04W 72/12* (2023.01)
*H04W 72/044* (2023.01)
*H04W 88/06* (2009.01)

(52) U.S. Cl.
CPC ..... *H04W 72/1215* (2013.01); *H04W 72/044* (2013.01); *H04W 88/06* (2013.01)

(58) Field of Classification Search
CPC ........... H04W 72/1215; H04W 72/044; H04W 88/06; H04W 72/21; H04W 74/004;
(Continued)

(56) References Cited

U.S. PATENT DOCUMENTS

| | | | | |
|---|---|---|---|---|
| 2013/0303240 A1* | 11/2013 | Sanka | .................. | H04W 48/12 |
| | | | | 455/558 |
| 2015/0056933 A1* | 2/2015 | Yan | .......................... | H04B 1/44 |
| | | | | 455/78 |

(Continued)

FOREIGN PATENT DOCUMENTS

| | | |
|---|---|---|
| EP | 3764677 A1 | 1/2021 |
| WO | 2020146892 A1 | 7/2020 |

OTHER PUBLICATIONS

PCT/CN2021/115030 , International Search Report and Written Opinion, Apr. 18, 2022, 9 pages.

*Primary Examiner* — Andrew W Chriss
(74) *Attorney, Agent, or Firm* — Dorsey & Whitney LLP

(57) ABSTRACT

Systems and methods for reducing collisions of transmission data for a first subscriber (e.g., a voice subscriber) with transmission data for a second subscriber (e.g., a data subscriber) at a dual sim dual active (DSDA) user equipment (UE) are described herein. A DSDA UE may be configured to implement a modified skipUplinkTxDynamic feature that avoids collisions by buffering transmission data of the data subscriber and sending a (later) scheduling request (SR) for a grant for that data. A DSDA UE may regulate data subscriber transmissions to avoid a transmission duration for the voice subscriber. A DSDA UE may reduce certain transmissions for a voice subscriber (subject to a block error rate (BLER) threshold for the voice subscriber) to lower the probability of collision. A DSDA UE may operate a data
(Continued)

subscriber and a voice subscriber in the same cell to avoid collisions due to RF tuning and/or relative slot overlap.

20 Claims, 12 Drawing Sheets

(58) Field of Classification Search
CPC .......... H04W 74/0841; H04W 28/0278; H04L 1/1854; H04L 5/001; H04L 5/0048; H04L 5/0055; H04L 5/0057; H04L 5/0064
See application file for complete search history.

(56) References Cited

U.S. PATENT DOCUMENTS

| | | | | |
|---|---|---|---|---|
| 2015/0139015 A1* | 5/2015 | Kadous | ............. | H04W 36/0085 |
| | | | | 370/252 |
| 2015/0296534 A1* | 10/2015 | Han | ...................... | H04W 72/21 |
| | | | | 455/436 |
| 2016/0050686 A1* | 2/2016 | Krishnamoorthi | .... | H04W 28/04 |
| | | | | 455/418 |
| 2016/0095015 A1* | 3/2016 | Mohseni | ............. | H04W 74/085 |
| | | | | 370/329 |
| 2016/0150568 A1* | 5/2016 | Dhanda | ............... | H04L 65/1069 |
| | | | | 370/235 |
| 2016/0174187 A1* | 6/2016 | Gopala Krishnan | ........................ | |
| | | | | H04B 1/3816 |
| | | | | 455/458 |
| 2016/0227557 A1 | 8/2016 | Fanous et al. | | |
| 2016/0323860 A1* | 11/2016 | Matin | ................... | H04L 1/1825 |
| 2016/0338077 A1* | 11/2016 | Chin | ................ | H04W 72/1215 |
| 2018/0160422 A1* | 6/2018 | Pathak | .................. | H04W 76/10 |
| 2019/0215783 A1* | 7/2019 | Chakraborty | ....... | H04W 52/146 |
| 2021/0029241 A1 | 1/2021 | Zheng et al. | | |
| 2021/0160901 A1* | 5/2021 | Takeda | .................. | H04W 72/21 |
| 2022/0256328 A1* | 8/2022 | Xie | ..................... | H04W 72/044 |

* cited by examiner

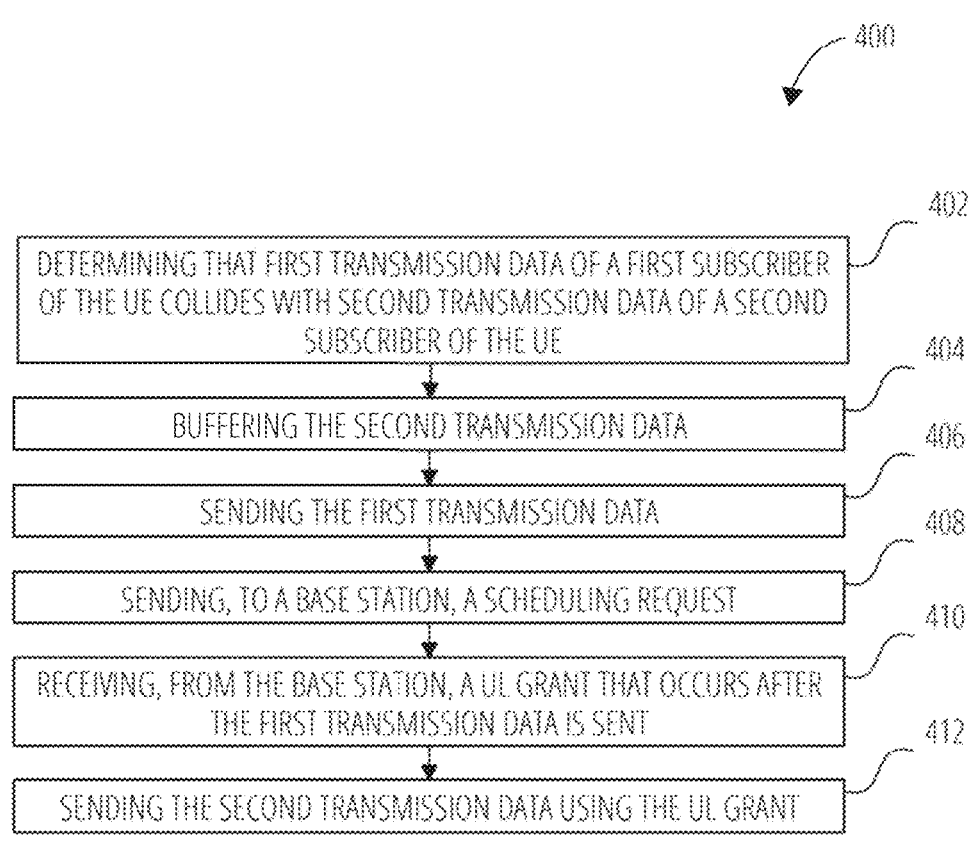

_400_

_402_

DETERMINING THAT FIRST TRANSMISSION DATA OF A FIRST SUBSCRIBER OF THE UE COLLIDES WITH SECOND TRANSMISSION DATA OF A SECOND SUBSCRIBER OF THE UE

_404_

BUFFERING THE SECOND TRANSMISSION DATA

_406_

SENDING THE FIRST TRANSMISSION DATA

_408_

SENDING, TO A BASE STATION, A SCHEDULING REQUEST

_410_

RECEIVING, FROM THE BASE STATION, A UL GRANT THAT OCCURS AFTER THE FIRST TRANSMISSION DATA IS SENT

_412_

SENDING THE SECOND TRANSMISSION DATA USING THE UL GRANT

FIG. 4

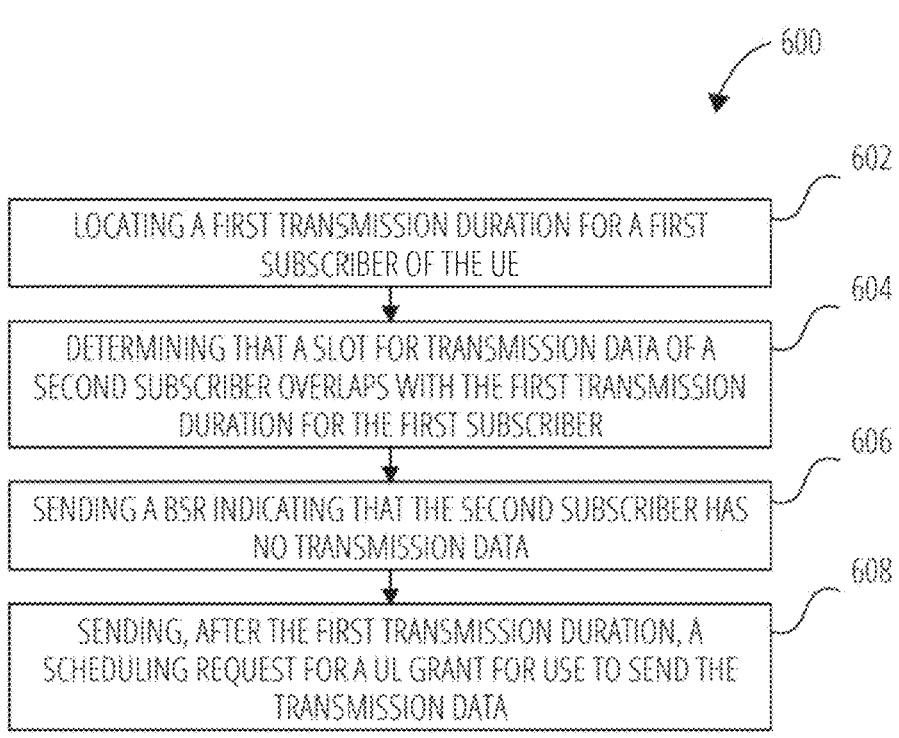

600

602
LOCATING A FIRST TRANSMISSION DURATION FOR A FIRST
SUBSCRIBER OF THE UE

604
DETERMINING THAT A SLOT FOR TRANSMISSION DATA OF A
SECOND SUBSCRIBER OVERLAPS WITH THE FIRST TRANSMISSION
DURATION FOR THE FIRST SUBSCRIBER

606
SENDING A BSR INDICATING THAT THE SECOND SUBSCRIBER HAS
NO TRANSMISSION DATA

608
SENDING, AFTER THE FIRST TRANSMISSION DURATION, A
SCHEDULING REQUEST FOR A UL GRANT FOR USE TO SEND THE
TRANSMISSION DATA

DETERMINING THAT FIRST TRANSMISSION DATA OF A VOICE SUBSCRIBER OF THE UE COLLIDES WITH SECOND TRANSMISSION DATA OF A DATA SUBSCRIBER OF THE UE

904

DROPPING THE FIRST TRANSMISSION DATA

906

SENDING THE SECOND TRANSMISSION DATA

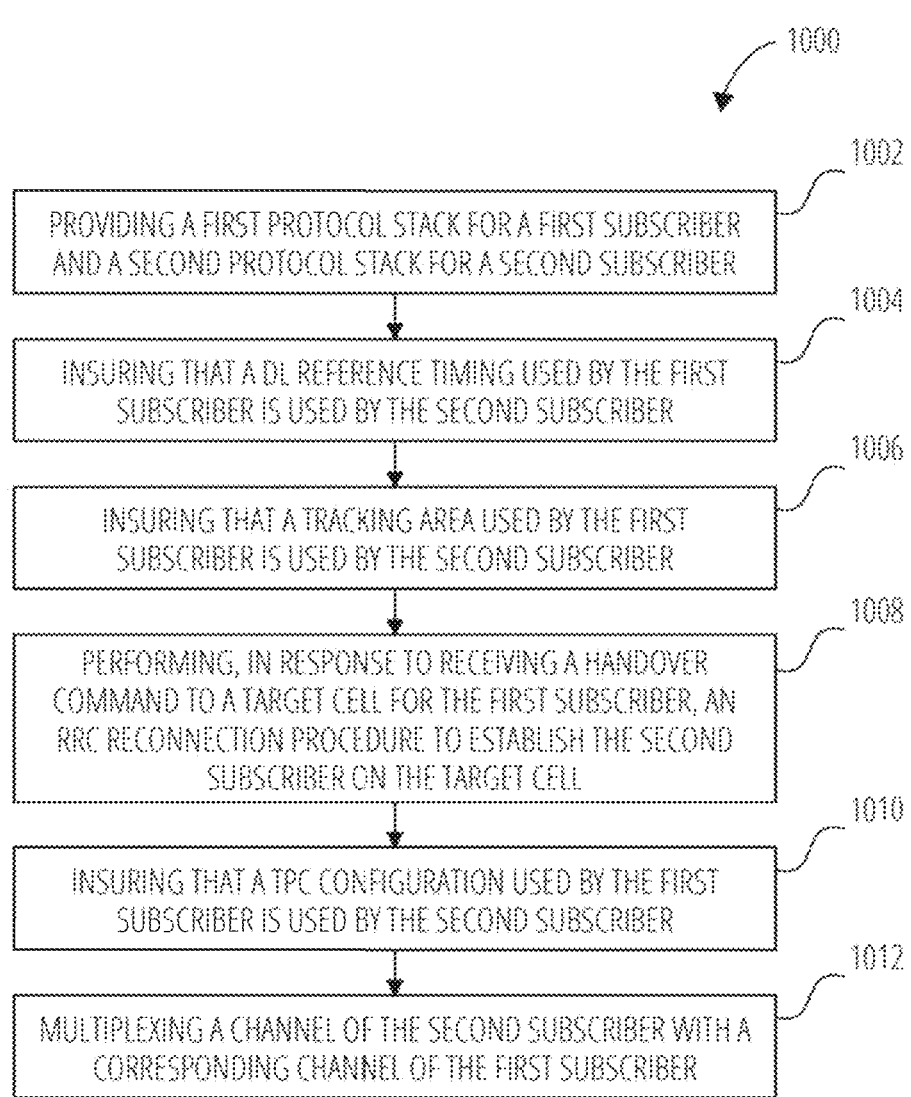

1000

1002
PROVIDING A FIRST PROTOCOL STACK FOR A FIRST SUBSCRIBER AND A SECOND PROTOCOL STACK FOR A SECOND SUBSCRIBER

1004
INSURING THAT A DL REFERENCE TIMING USED BY THE FIRST SUBSCRIBER IS USED BY THE SECOND SUBSCRIBER

1006
INSURING THAT A TRACKING AREA USED BY THE FIRST SUBSCRIBER IS USED BY THE SECOND SUBSCRIBER

1008
PERFORMING, IN RESPONSE TO RECEIVING A HANDOVER COMMAND TO A TARGET CELL FOR THE FIRST SUBSCRIBER, AN RRC RECONNECTION PROCEDURE TO ESTABLISH THE SECOND SUBSCRIBER ON THE TARGET CELL

1010
INSURING THAT A TPC CONFIGURATION USED BY THE FIRST SUBSCRIBER IS USED BY THE SECOND SUBSCRIBER

1012
MULTIPLEXING A CHANNEL OF THE SECOND SUBSCRIBER WITH A CORRESPONDING CHANNEL OF THE FIRST SUBSCRIBER

FIG. 10

SYSTEMS AND METHODS FOR REDUCING TRANSMISSION DATA COLLISION FOR DUAL SUBSCRIBER DUAL ACTIVE DEVICES

TECHNICAL FIELD

This application relates generally to wireless communication systems, including wireless communications systems incorporating a dual sim dual active (DSDA) user equipment (UE) that is configured to reduce collisions between first transmission data for a first subscriber of a DSDA UE and second transmission data for a second subscriber of the DSDA UE.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi*).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 illustrates a method of a UE implementing a dual subscriber dual active (DSDA) mode, according to an embodiment.

FIG. 6 illustrates a method of a UE implementing a DSDA mode, according to an embodiment.

FIG. 10 illustrates a method of a UE implementing a DSDA mode, according to an embodiment.

DETAILED DESCRIPTION

Figure 1:
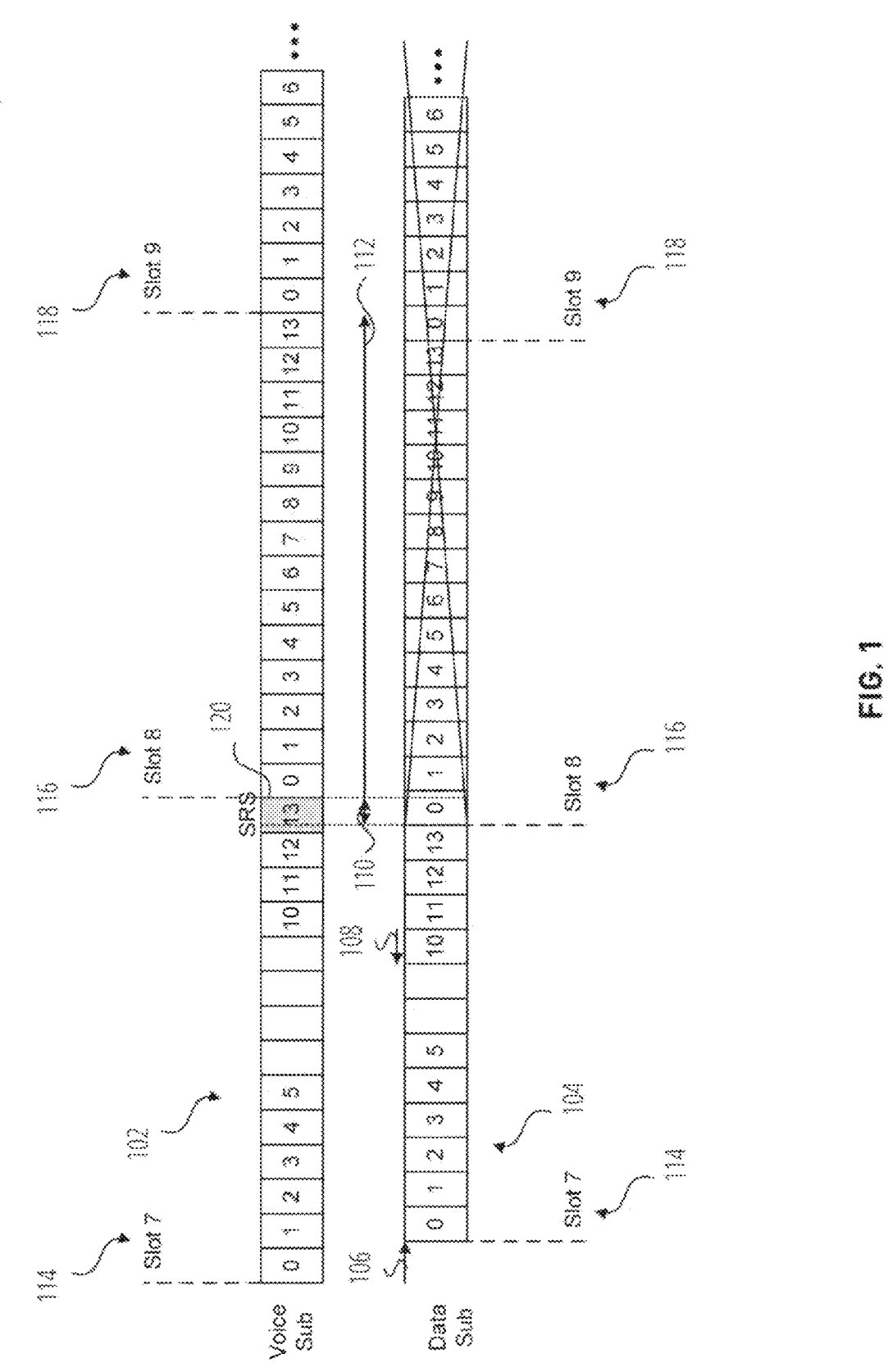
FIG. 1 illustrates a diagram showing user equipment (UE) activity on slots located on each of a voice subscriber and a data subscriber, according to an embodiment.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

A UE may connect to a network according to a subscriber identity associated with that network. A subscriber identity for (and used by) the UE may be stored in a subscriber identity module (SIM) of the UE. In some cases, a SIM is incorporated into a removable card that, when inserted into a UE, enables the UE to implement the subscriber associated with the SIM on the associated network. In some cases, an embedded SIM (eSIM) that is incorporated into the UE itself enables the UE to implement the subscriber associated with the eSIM on the associated network.

In some cases, a UE may be able to implement more than one subscriber. For example, it may be that the UE may be able to implement a first subscriber according to a first SIM, and also implement a second subscriber according to a second SIM. Either of the first and/or second SIM may be located at the UE using, e.g., a SIM card, an eSIM, etc., as described above. UE than can implement a pair of subscribers/SIMs in this fashion may be referred to as "dual subscriber UE" or a "dual SIM UE."

Different dual SIM UE may implement their pair of subscribers in different ways. In one case, a UE may place one subscriber in a radio resource control (RRC) inactive mode while another subscriber is being actively used. This may be called a "single active" mode. In other cases, a UE may be able to maintain both subscribers in an RRC active mode simultaneously. This may be called a "dual active" mode. Accordingly, it may be that a dual SIM UE that is also capable of using a "dual active" mode may be referred to as a "dual SIM dual active" (DSDA) UE.

Some DSDA UEs may be capable of implementing the dual active mode between two subscribers at the RRC level, but may in any event be limited to actually performing physical transmissions for one subscriber at a time. This may be because, for example, the different subscribers use different frequencies, and there is not sufficient hardware, such as power amplifiers (PA), to physically produce simultaneous transmissions for both subscribers, and/or because simultaneous transmissions for both subscribers are limited/prevented at the UE due to inter-modulation distortion (IMD) effects that would occur, etc. In such cases, it may be that the DSDA UE will alternate the use of the physical transmission resources of the UE by each active subscriber in turn. This may occur dynamically or semi-persistently as between the two subscribers.

One contemplated case where such a DSDA UE may be used is a case where a first subscriber is implemented by the UE to send and/or receive voice traffic, and a second subscriber is implemented by the UE to send and/or receive other types of traffic (e.g., non-voice data) for the UE. This functional division may reflect real-world applications for DSDA UEs, where it may be the case that, for example, a first network (associated with the first subscriber) charges competitive rates for handling voice traffic, while a second network (associated with the second subscriber) charges competitive rates for handling other (non-voice) types of traffic. Herein, a subscriber for voice traffic may be referred as a "voice subscriber," while a subscriber for non-voice or other types of traffic may be referred to as a "data subscriber" (though it will be understood that voice traffic for the voice subscriber is also a type of data, in the general sense). A user of the UE may be associated with (e.g., use) both the voice subscriber and a data subscriber of the UE.

In the case of a DSDA UE having a voice subscriber and a data subscriber, it may be that the voice subscriber is given a type of priority over the data subscriber. For example, there may be a prioritized period (e.g., 10 ms out of every 40 ms, in some contemplated cases) during which/associated with which a transmission of transmission data of the voice subscriber will take priority over a transmission of transmission data of the data subscriber, to the extent that these collide. The prioritized period may, in some embodiments, align to a voice subscriber periodicity (e.g., the 40 ms) that itself defines periods within which a voice subscriber may have one prioritized period.

Then, a collision between transmission data of a first subscriber and transmission data of a second subscriber may occur when each set of transmission data is scheduled for the same slot. Additionally, a collision between first transmission data of a first subscriber and second transmission data of a second subscriber may occur when the transmission of the first transmission data of the first subscriber in a first slot has the ultimate effect of not permitting the transmission of the second transmission data of the second subscriber in a second slot (as will be described in additional detail below).

Accordingly, it may be said that the data subscriber has potential to have one or more of its transmissions during such affected slots 'blanked' by the voice subscriber during and/or attendant to the use of a prioritized period. Giving the voice subscriber priority during and/or attendant to the described period may help to ensure acceptable (e.g., lowlatency) voice-related operation of the UE. In some embodiments, the voice subscriber may not transmit at all outside of this prioritized period. In such cases, the prioritized period for the voice subscriber (during which the voice subscriber may transmit) may be referred to as an 'on duration' for the voice subscriber.

Any blanking of transmissions by the data subscriber may have downstream impacts on the performance of the data subscriber going forward. For example, it may be that the blanked transmissions by the data subscriber were previously scheduled by the network associated with the data subscriber. In such cases, the blanked transmissions may be treated by that network as having failed for purposes of determining a block error rate (BLER) for the data subscriber (e.g., because the network is not aware of the blanking, and therefore still expects the transmissions from the data subscriber in any event). In the event that blanking by the voice subscriber drives the BLER associated with the data subscriber (as perceived by the network) above a certain threshold of that network (e.g., 10%), the network of the data subscriber may execute a modulation and coding scheme (MCS) penalty for the data subscriber, where it assigns the data subscriber a lower (e.g., zero) MCS level in an effort to simplify transmission complexity (behavior motivated by an erroneous presumption that the scheduled transmission was actually transmitted by the UE, but lost). This lower MCS level, when used by the data subscriber, accordingly negatively impacts the data transfer rate of the data subscriber going forward.

Even in cases where the network may support discontinuous transmission (DTX) modes (and therefore may not execute an MCS penalty for the reasons described above) the BLER can still be driven above the threshold because of the blanking behavior. For example, for some high MCS levels, retransmission of non-RV0 is not self-decodable, and therefore causes continuous BLER. Further, an L2 packet may be missing in the case that physical hybrid automatic repeat request (HARQ) fails due to blanking affecting uplink (UL).

FIG. 1 illustrates a diagram 100 showing UE activity on slots located on each of a voice subscriber 102 and a data subscriber 104, according to an embodiment. FIG. 1 corresponds to a case where the UE is to alternate the use of its physical transmission resources between each of the voice subscriber 102 and the data subscriber 104 in turn, as described above. In FIG. 1, the voice subscriber 102 uses a first cell and the data subscriber 104 uses a second cell.

The UE may alternate the use of the physical transmission resources between the voice subscriber 102 and the data subscriber 104 on a slot-wise basis. Accordingly, a slot that is used by one of the voice subscriber 102 and the data subscriber 104 for transmission is therefore not useable for transmission by the other of the voice subscriber 102 and the data subscriber 104.

In the example of FIG. 1, the relative alignment (in time) for each of a first slot 114, a second slot 116, and a third slot 118 across each of the voice subscriber 102 and the data subscriber 104 is illustrated. As can be seen, the relative locations of each of these slots as understood at each of the voice subscriber 102 and the data subscriber 104 may differ. This may be because, for example, the location of the UE is near the source of the first cell (for the voice subscriber 102) but is farther from the source of the second cell (for the data subscriber 104). In such "far-near effect" cases, it may be that relative timing differences are present between the subscribers in order to account for, for example, the longer propagation time for signals sent to and/or from the second cell for the data subscriber 104.

For example, in FIG. 1, it may be that the illustrated symbols 0 through 5 of the first slot 114 are assigned for downlink (DL) reception. Accordingly, there may be a relative delay 106 applied to the location of these symbols as understood by the data subscriber 104 in order to account for the later absolute time at which signaling from the source of the second cell for the data subscriber 104 arrives at the UE as compared to the source of the first cell for the voice subscriber 102.

It may also be that the remaining symbols (e.g., symbols 10 through 13) of the first slot 114, the symbols 0 through 13 of the second slot 116, and the symbols 0 through 6 of the third slot 118, are assigned for UL transmission. Accordingly, there may be a timing advance 108 applied at the data subscriber 104 in order to account for the relatively longer time it takes for signaling from the UE to arrive at the second cell for the data subscriber 104 as opposed to signaling from the UE to arrive at the first cell for the voice subscriber 102.

As illustrated, it may be that the use of the timing advance 108 causes the symbol locations, as understood by the voice subscriber 102, to overlap 110 with the locations of (other) symbols as understood by the data subscriber 104. This overlap 110 is illustrated relative to the location, on the voice subscriber 102, of symbol number 13 of the first slot 114 and the location, on the data subscriber 104, of symbol number 0 of the second slot 116. It should be understood that, while not explicitly illustrated, a similar overlapping occurs for each of the other UL symbols of the first slot 114, the second slot 116, and the third slot 118 that occur at or after the timing advance 108 is applied to the data subscriber 104.

In FIG. 1, the voice subscriber 102 sends, for example, a sounding reference signal (SRS) 120 in symbol number 13 of the first slot 114, as illustrated. Due to the overlap 110, this transmission extends into the location of symbol 0 for the second slot 116 on the data subscriber 104. Then, after the transmission of the SRS 120 on the voice subscriber 102, in order to perform transmissions for the data subscriber 104, radio frequency (RF) tuning 112 is performed to prepare the hardware to transmit on the second cell for the data subscriber 104. The process of RF tuning 112 may include both RF tuning and any associated power amplified (PA) down-up masking. During RF tuning, the data subscriber 104 cannot send transmission data for the data subscriber 104 (as the physical resources of the UE are not yet set to perform such transmissions). As can be seen, the UE implements the RF tuning 112 during the second slot 116 as understood by the voice subscriber 102. However, due to the effect of the timing advance 108, symbol 13 of the second slot 116 as understood by the voice subscriber 102, which is used for RF tuning, overlaps with symbol 0) of the third slot 118 as understood by the data subscriber 104.

The overall result is that, because of the combined effect from the location at the end of the first slot 114 of the SRS 120 by the voice subscriber 102 and the subsequent RF tuning 112 in view of the timing advance 108, neither of the second slot 116 nor the third slot 118 is useable by the data subscriber 104 for transmission data. In other words, FIG. 1 illustrates how collisions of transmission data of the data subscriber 104 (supposing such was present in either of the second slot 116 or the third slot 118) with transmission data (e.g., the SRS 120) of the data subscriber 104 may occur in subsequent slots that are not actually used for transmission data by the voice subscriber 102.

While FIG. 1 illustrates the effects of the timing advance 108 and the RF tuning 112 jointly (for efficiency of disclosure), it should be understood that one or the other of, e.g., the timing advance 108 or the RF tuning 112 may (individually) occur. For example, in a case where the timing advance 108 occurs but RF tuning 112 is not necessary, it would still be the case that the SRS 120 collides with transmission data for the data subscriber 104 on the second slot 116 due to the overlap 110. Further, in the event that voice subscriber 102 and the data subscriber 104 are aligned in time but where RF tuning 112 is still necessary, the RF tuning 112 during the second slot 116 would prevent the transmission of transmission data for the data subscriber 104 in the second slot 116. Because the RF tuning 112 could not begin until the SRS 120 was finished being transmitted, this may be understood to be a collision between such transmission data for the data subscriber 104 that is scheduled for the second slot 116 and the SRS 120.

Further, when a prioritization period is used for the voice subscriber 102 in the manner previously described, it is contemplated that collisions occurring between transmission data of the voice subscriber 102 in a first slot and transmission data of the data subscriber 104 in a second (and potentially subsequent) slots (such as those collisions described in FIG. 1) may occur even in the case where the first slot is within the prioritization period used by the voice subscriber 102 but where the second and/or subsequent slots are outside of the prioritization period used by the voice subscriber 102, as will be shown.

Figure 2:
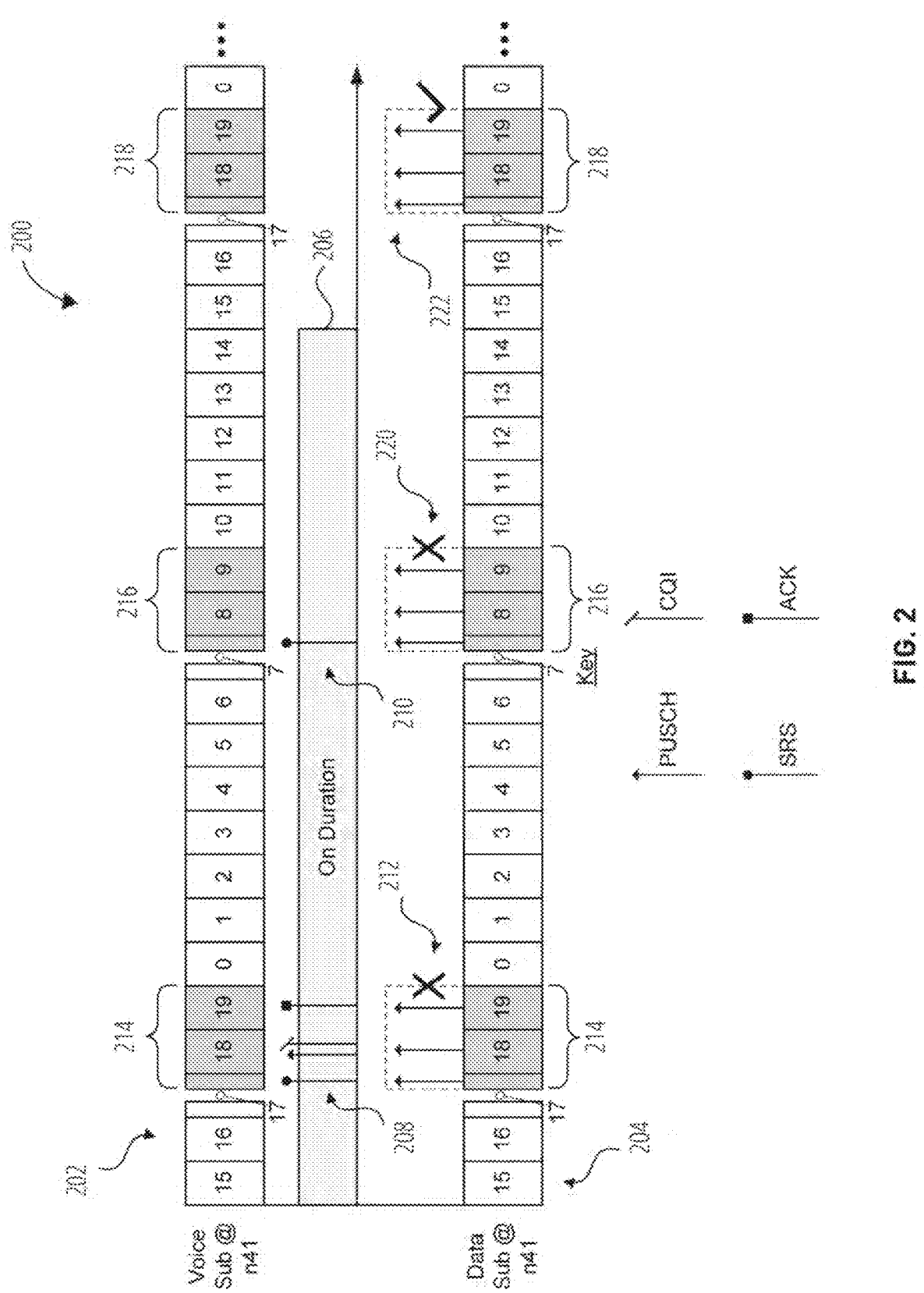
FIG. 2 illustrates a diagram showing UE activity on slots located on each of a voice subscriber and a data subscriber, according to an embodiment.

FIG. 2 illustrates a diagram 200 showing UE activity on slots located on each of a voice subscriber 202 and a data subscriber 204, according to an embodiment. The embodiment of FIG. 2 corresponds to the use of the n41 frequency band by the UE. In FIG. 2, slots for UL use are shaded grey.

The diagram 200 illustrates a prioritized period 206 for the voice subscriber 202. During the prioritized period 206, the voice subscriber 202 sends first transmission data 208 comprising an SRS, a physical uplink shared channel (PUSCH), a channel quality indicator (CQI) and an acknowledgement signal (ACK) during the first UL slots 214 and the second transmission data 210 comprising an SRS during the second UL slots 216, as indicated. For purposes of FIG. 2, partial slots indicated with shading should be understood to be part of any described "UL slots" as these are indicated with brackets.

As illustrated, the data subscriber 204 has third transmission data 212 comprising three PUSCH that are scheduled to transmit during the first UL slots 214. However, because the first UL slots 214 are each being used for part of the first transmission data 208, the first UL slots 214 cannot be used for the third transmission data 212 (this is represented by the illustrated "X"). The third transmission data 212 is accordingly in a state of collision with the first transmission data 208.

As illustrated, the data subscriber 204 has fourth transmission data 220 comprising three PUCSH that are scheduled to transmit during the second UL slots 216. However, the SRS of the second transmission data 210 may be sent on the final symbol of slot 7 of the second UL slots 216 (as illustrated). Further, it may be that the data subscriber 204 uses a timing advance that causes the second UL slots 216 as understood by the voice subscriber 202 to overlap their respective subsequent slots as they are understood by the data subscriber 204 (and thus the SRS of the second transmission data 210 occurs during part of slot 8 of the second UL slots 216 as understood by the data subscriber 304), as described in FIG. 2. Further, it may be that RF tuning after the second transmission data 210 (to prepare the UE to transmit on the data subscriber 204) takes at least 0.5 ms (the duration of one illustrated slot) after the sending of the SRS of the second transmission data 210. In these circumstances, due to the effect of the timing advance, the RF tuning does not complete until sometime during slot 9 of the second UL slots 216 as these are understood by the data subscriber 204, as described in FIG. 2. Accordingly, none of the second UL slots 216 can be used for any part of the fourth transmission data 220 (this is represented by the illustrated "X"). The fourth transmission data 220 is accordingly in a state of collision with the second transmission data 210.

That FIG. 2 illustrates that the entirety of the second UL slots 216 on the data subscriber 204 have their transmissions blanked is given by way of example and not by way of limitation. For example, in an alternative case to that described in relation to FIG. 2, it may be that an SRS of transmission data corresponding to the second transmission data 210 is sent on the final symbol of slot 7 of the slots that correspond to the second UL slots 216. However, it may be that a data subscriber of the alternative example uses a timing advance value that is the same as, or less than, a timing advance value that is used on a voice subscriber, and/or that any RF tuning may take less than 0.5 ms (e.g., again supposing a slot duration of 0.5 ms). In such cases, it is possible that only some of the slots corresponding to the second UL slots 216 would therefore have their transmissions blanked. For example, it may be that the end of slot 7 and slot 8 have their transmissions blanked, but that the relative timing advance characteristics between the data subscriber and the voice subscriber and/or the smaller RF tuning time may leave the UE capable of using slot 9 of the slots corresponding to the second UL slots 216 on the data subscriber. Slot 9 could then be used to transmit the third PUSCH of the transmission data that is found in that slot. Accordingly, it may be said in such a case that some transmission data (corresponding to the first and second PUSCH of the fourth transmission data 220 illustrated in FIG. 2) is blanked, while other (e.g., separate) transmission data (corresponding to the third PUSCH of the fourth transmission data 220 illustrated in FIG. 2) is not blanked.

Returning to FIG. 2, as illustrated, the data subscriber 204 has fifth transmission data 222 that is scheduled to transmit during the third UL slots 218. The third UL slots 218 are outside of the prioritized period 206 for the voice subscriber 202, and are further not impacted by any immediately previous transmissions for the voice subscriber 202 that occurred during the prioritized period 206. Accordingly, there is no collision, and the fifth transmission data 222 for the data subscriber 204 is sent by the UE (this is represented by the illustrated checkmark). This state remains the case for any subsequent transmission data for the data subscriber 204 until such a time as a next prioritized period for the voice subscriber 202 begins.

In the embodiment of FIG. 2, the prioritized period 206 may be 10 ms long and repeat every 40 ms. In such a case, it can be determined (by extending the pattern of the data subscriber 204 through the entire 40 ms) that there would be a total of 16 (full) slots during which PUSCH transmissions are attempted, during which 4 have their transmissions blanked due to collision (as illustrated). Accordingly, the slot-wise blanking rate for the embodiment of FIG. 2 may be, e.g., 4 out of 16 (or 25%). Supposing that a BLER threshold for the data subscriber 204 is configured at 10% (as may be the case), the network may respond to the apparent passing of this threshold by driving the MCS level for the data subscriber 204 lower (e.g., to zero), in the manner described above. Throughput on the data subscriber will be negatively impacted as a result.

While FIG. 2 has been illustrated in the case of radio frames having 20 slots, it is contemplated that similar principles would be analogously applicable in cases where a different numerology is used.

Figure 3:
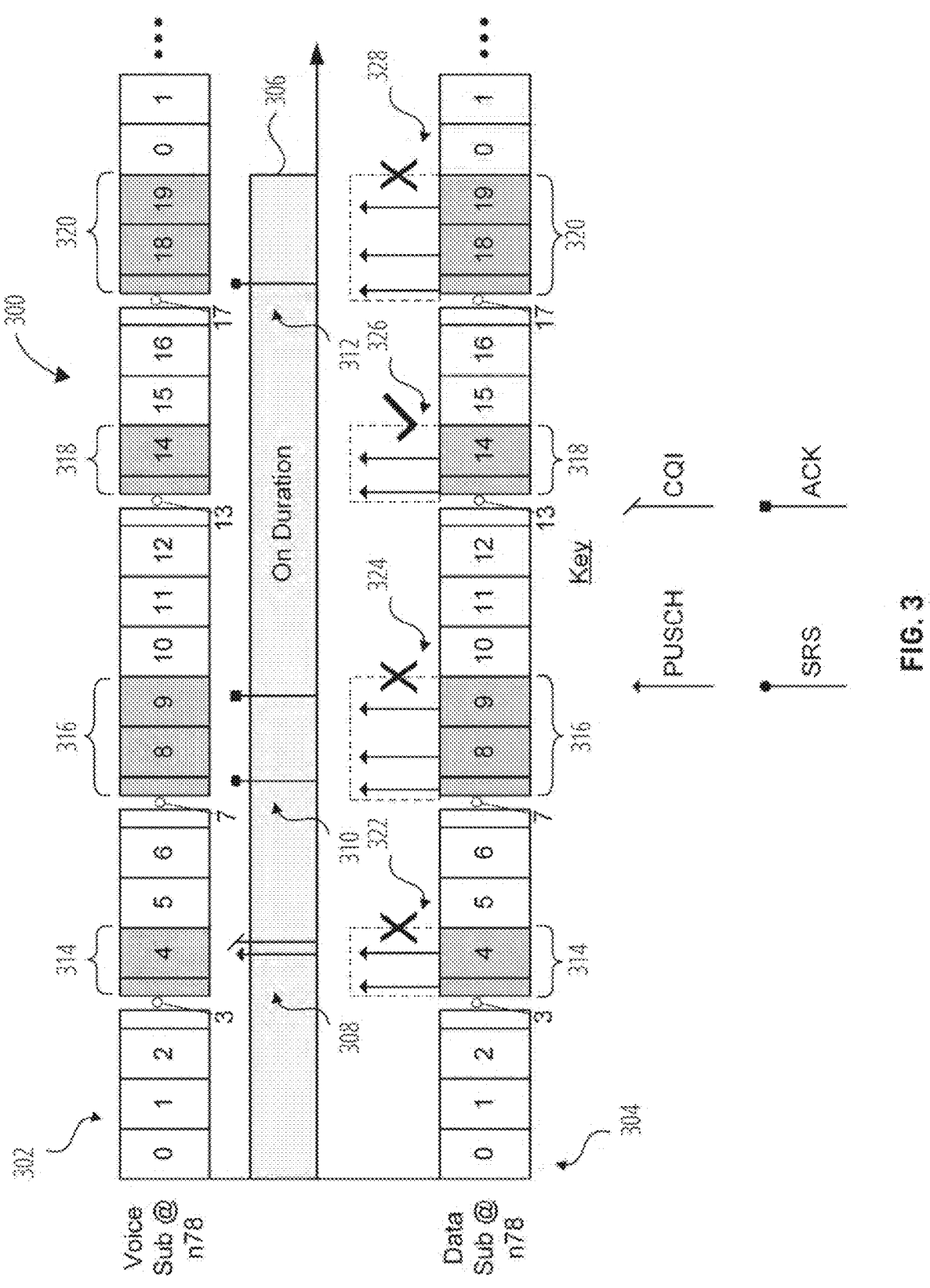
FIG. 3 illustrates a diagram showing UE activity on slots located on each of a voice subscriber and a data subscriber, according to an embodiment.

FIG. 3 illustrates a diagram 300 showing UE activity on slots located on each of a voice subscriber 302 and a data subscriber 304, according to an embodiment. The embodiment of FIG. 3 corresponds to the use of the n78 frequency band by the UE. In FIG. 3, slots for UL use are shaded grey.

The diagram 300 illustrates a prioritized period 306 for the voice subscriber 302. During the prioritized period 306, the voice subscriber 302 sends first transmission data 308 comprising a PUSCH and a CQI during the first UL slots 314, the second transmission data 310 comprising an SRS and an ACK during the second UL slots 316, no transmission data during the third UL slots 318, and the third transmission data 312 comprising an SRS during the fourth UL slots 320, as indicated. For purposes of FIG. 3, partial slots indicated with shading should be understood to be part of any described "UL slots" as these are indicated with brackets.

As illustrated, the data subscriber 304 has fourth transmission data 322 comprising two PUSCH that are scheduled to transmit during the first UL slots 314. However, because slot 4 of the first UL slots 314 is being used for the first transmission data 308, slot 4 of the first UL slots 314 cannot be used by the data subscriber 304. Further, slot 3 also cannot be used for the first illustrated PUSCH of the fourth transmission data 322 because there would not be sufficient time for the UE to perform RF tuning between the time of that PUSCH and the time of the first PUSCH of the first transmission data 308. Accordingly, the first UL slots 314 cannot be used for the first UL slots 314 (this is represented by the illustrated "X"). The fourth transmission data 322 is accordingly in a state of collision with the first transmission data 308.

As illustrated, the data subscriber 304 has fifth transmission data 324 comprising three PUCSH that are scheduled to transmit during the second UL slots 316. However, the SRS of the second transmission data 310 may be sent on the final symbol of slot 7 of the second UL slots 216 (as illustrated). Accordingly, the first PUSCH of the fifth transmission data 324 cannot be sent during slot 7. Further, it may not be possible to allow a transmission of the second PUSCH of the fifth transmission data 324 in slot 8. This may be because, e.g., the SRS of the second transmission data 310 overlaps into slot 8 (as in cases described in relation to FIG. 2), and/or because the UE determines that there would not be time to perform RF tuning to the data subscriber 304 to transmit for the slot 8 PUSCH of the fifth transmission data 324 (and/or to again perform RF tuning back to the voice subscriber 302 to then transmit the slot 9 ACK of the second transmission data 310). Accordingly, none of the third UL slots 218 can be used for any part of the fifth transmission data 324 (this is represented by the illustrated "X"). The fifth transmission data 324 is accordingly in a state of collision with the second transmission data 310.

As illustrated, the data subscriber 304 has sixth transmission data 326 comprising two PUSCH that are scheduled to transmit during the third UL slots 318. While the third UL slots 318 are in the prioritized period 306 for the voice subscriber 302, there is no transmission data for the voice subscriber 302 during the third UL slots 318. Further, the sixth transmission data 326 is not impacted by any immediately previous transmissions for the voice subscriber 302 during the prioritized period 306 (e.g., there is sufficient time to account for any slot overlap and/or for RF tuning prior to sending the sixth transmission data 326 on the data subscriber 304). Accordingly, there is no collision, and the sixth transmission data 326 for the data subscriber 304 is sent by the UE (this is represented by the illustrated checkmark).

As illustrated, the data subscriber 304 has seventh transmission data 328 comprising three PUSCH that are scheduled to transmit during the fourth UL slots 320. However, the SRS of the third transmission data 312 may be sent on the final symbol of slot 17 of the fourth UL slots 320 (as illustrated). Further, it may be that the data subscriber 304 uses a timing advance that causes the fourth UL slots 320 as understood by the voice subscriber 302 to overlap their respective subsequent slots as they are understood by the data subscriber 304 (and thus the SRS of the third transmission data 312 occurs during part of slot 18 of the fourth UL slots 320 as understood by the data subscriber 304), as described in FIG. 2. Further, it may be that RF tuning after the third transmission data 312 (to prepare the UE to transmit on the data subscriber 304) takes at least 0.5 ms (the duration of one illustrated slot) after the sending of the SRS of the third transmission data 312. In these circumstances, due to the effect of the timing advance, the RF tuning does not complete until sometime during slot 19 of the fourth UL slots 320 as these are understood by the data subscriber 304, as described in FIG. 2. Accordingly, none of the fourth UL slots 320 can be used for any part of the seventh transmission data 328 (this is represented by the illustrated "X"). The seventh transmission data 328 is accordingly in a state of collision with the third transmission data 312. As was described in relation to the second UL slots 216 of FIG. 2, the fact that FIG. 3 illustrates that the entirety of the fourth UL slots 320 on the data subscriber 304 have their transmissions blanked is given by way of example and not by way of limitation.

In the embodiment of FIG. 3, the prioritized period 306 may be 10 ms long and repeat every 40 ms. In such a case, it can be determined (by extending the pattern of the data subscriber 304 through the entire 40 ms) that there would be a total of 24 (full) slots during which PUSCH transmissions are scheduled, 5 of which have their transmissions blanked due to collision (as illustrated). Accordingly, the slot-wise blanking rate for the embodiment of FIG. 2 may be 5 out of 24 (or 20.8%). Supposing that a BLER threshold for the data subscriber 304 is configured at 10% (as may be the case), the network may respond to the apparent passing of this threshold by driving the MCS level for the data subscriber 304 lower (e.g., to zero), in the manner described above. Throughput on the data subscriber will be negatively impacted as a result.

While FIG. 3 has been illustrated in the case of radio frames having 20 slots, it is contemplated that similar principles would be analogously applicable in cases where a different numerology is used.

In cases such as the examples given in FIG. 2 and FIG. 3, it may be that overall, an uplink throughput on the data subscriber degrades by up to 100% as compared to an ideal case. The root cause of these issues may be that the apparent BLER as perceived by the network is over 10%, which drives an MCS level for the data subscriber to zero.

Systems and methods described herein may alleviate the issues described above. For example, systems and methods described herein may allow for a DSDA UE implementing a first subscriber (e.g., a voice subscriber) and a second subscriber (e.g., a data subscriber) to allow for the use of a prioritized period for voice subscriber in such a manner that, e.g., an MCS penalty corresponding to the data subscriber is avoided.

In some cases, a DSDA UE may implement a modified skipUplinkTxDynamic feature. Some implementations of a skipUplinkTxDynamic feature may allow a UE not to assemble a HARQ protocol data unit (PDU) and/or PUSCH in cases where the corresponding transmission buffer of the UE has no actual data to send. It is contemplated that such a skipUplinkTxDynamic feature could be modified to allow A DSDA UE to also skip an attempt to send PUSCH on a data subscriber in the case that the PUSCH will be blanked due to transmission activity of the voice subscriber, in the manner described above. Such a skipUplinkTxDynamic feature may be controlled by a transmission skipping parameter (e.g., of the same designation) that is configured to the UE by a network (e.g., of the data subscriber).

In cases where a skipUplinkTxDynamic feature is not used, the UE may be configured to assemble padding in a medium access control (MAC) PDU for transmission, even in the event that there is no user-plane data to send. In cases where the skipUplinkTxDynamic feature is used, a UE may skip the assembly and transmission of a PUSCH if there is no data available. The network may be able to detect this skipUplinkTxDynamic according to a DTX mode, and accordingly would not schedule retransmission resource for the corresponding unused transmission opportunity. In such cases, a connected mode DRX (CDRX) is accordingly not affected.

It may therefore be considered to expand the skipUplinkTxDynamic to more cases than just the case where there is no data in a transmission buffer. Without an expanded skipUplinkTxDynamic feature, in the case of blanked transmission(s) on the data subscriber of a DSDA UE, it may be that in some scenarios the UE will still assemble data packets corresponding to those blanked transmissions into MAC PDU/transport blocks (TB), and accordingly will prepare for potential retransmission with an indicated redundancy version (and this behavior may drive the BLER perceived by the network higher, as described above). However, the application/expansion of the skipUplinkTxDynamic feature into this case may prevent this.

First, the DSDA UE may determine, based on scheduling for each of the voice subscriber and the data subscriber, that first transmission data of a first subscriber (e.g., the voice subscriber) collides with second transmission data of a second subscriber (e.g., the data subscriber). Each of the first subscriber and the second subscriber may report or exchange their scheduling information within the UE, allowing the UE to predict which slots correspond to a collision of transmission data (as described above in relation to FIG. 2 and FIG. 3) and thus which transmissions of, e.g., the second subscriber (assuming that the first subscriber has priority) will or will not occur. This process may be referred to as a transmission arbitration.

If a transmission skipping parameter associated with the skipUplinkTxDynamic feature is configured at the DSDA UE, the DSDA UE may skip the assembly of data (e.g., a MAC PDU for the corresponding HARQ) for these blanked transmission(s). Instead, once the UL grant for the blanked transmission(s) in these slots are received, the DSDA UE buffers the corresponding layer 2 (L2) packets for those transmissions. Further, the network may no longer associate a BLER with such blanked transmissions, according to the configured skipUplinkTxDynamic feature.

Then, the UE may trigger a scheduling request (SR) to recover UL scheduling such that the buffered L2 packets may be (later) sent. This may be performed because the network for the second subscriber (according to the skipUplinkTxDynamic feature) may no longer schedule UL grants for the second subscriber after a grant goes unused. The network may send, in response to the SR, a UL grant. This UL grant (e.g., an assigned time for transmission) may occur after a time that the first transmission is sent. This scheduling request may be triggered by the DSDA UE without (necessarily) waiting for the expiration of a buffer status report (BSR) timer such as a retxBSR-timer and/or a periodicBSR-timer, as may be the case under other applications of the skipUplinkTxDynamic feature. In some embodiments, this UL grant may also be intentionally configured by the network to occur at a time that does not cause a collision with transmission data of the first subscriber.

In such cases, the throughput loss on the data subscriber may depend on a configuration for an SR period used at the UE. For example, with an SR period of 20 ms, the throughput loss may be relieved from around 99% (as previously described) down to around 75%. Smaller SR periods may have better performance. The root cause of this improvement may be that, when the skipUplinkTxDynamic feature is used for blanked data subscriber transmissions in the manner described, the network no longer associates a BLER with such blanked transmissions, and thus no MCS penalty is applied for the data subscriber by the network. As described, an SR to recover UL scheduling may be used.

FIG. 4 illustrates a method 400 of a UE implementing a DSDA mode, according to an embodiment. The method 400 includes determining 402 that first transmission data of a first subscriber of the UE collides with second transmission data of a second subscriber of the UE.

The method 400 further includes buffering 404 the second transmission data.

The method 400 further includes sending 406 the first transmission data.

The method 400 further includes sending 408, to a base station, a scheduling request.

The method 400 further includes receiving 410, from the base station, a UL grant that occurs after the first transmission data is sent. The UL grant may be in response to the scheduling request.

The method 400 further includes sending 412 the second transmission data using the UL grant.

In some embodiments of the method 400, the first transmission data collides with the second transmission data during a prioritized for the first subscriber.

In some embodiments of the method 400, the UE determines that the first transmission data collides with the second transmission data because the second transmission data is for a same slot as the first transmission data. In some of these cases, the first transmission data comprises one of an SRS, a CQI, a PUSCH, and an ACK.

In some embodiments of the method 400, the first transmission data is for a first cell and the second transmission data is for a second cell, and the UE determines that the first transmission data collides with the second transmission data due to a timing offset between the first cell and the second cell at the UE that causes a first slot on the first cell for the first transmission data to overlap a second slot on the second cell for the second transmission data. In some of these embodiments, the first transmission data comprises an SRS.

In some embodiments of the method 400, the UE determines that the first transmission data collides with the second transmission data due to a period for RF tuning from first frequency resources for the first transmission data to second frequency resources for the second transmission data that overlaps a slot for the second transmission data.

In some embodiments of the method 400, the first subscriber is a voice subscriber and the second subscriber is a data subscriber.

In some embodiments, the method 400 further includes determining that a UL transmission skipping parameter is configured to the UE.

In some embodiments of the method 400, the scheduling request is sent to the base station without waiting for an expiry of a BSR timer.

Embodiments contemplated herein include an apparatus comprising means to perform one or more elements of the method 400. This apparatus may be, for example, an apparatus of a UE (such as a wireless device 1202 that is a UE, as described herein).

Embodiments contemplated herein include one or more non-transitory computer-readable media comprising instructions to cause an electronic device, upon execution of the instructions by one or more processors of the electronic device, to perform one or more elements of the method 400. This non-transitory computer-readable media may be, for example, a memory of a UE (such as a memory 1206 of a wireless device 1202 that is a UE, as described herein).

Embodiments contemplated herein include an apparatus comprising logic, modules, or circuitry to perform one or more elements of the method 400. This apparatus may be, for example, an apparatus of a UE (such as a wireless device 1202 that is a UE, as described herein).

Embodiments contemplated herein include an apparatus comprising: one or more processors and one or more computer-readable media comprising instructions that, when executed by the one or more processors, cause the one or more processors to perform one or more elements of the method 400. This apparatus may be, for example, an apparatus of a UE (such as a wireless device 1202 that is a UE, as described herein).

Embodiments contemplated herein include a signal as described in or related to one or more elements of the method 400.

Embodiments contemplated herein include a computer program or computer program product comprising instructions, wherein execution of the program by a processor is to cause the processor to carry out one or more elements of the method 400. The processor may be a processor of a UE (such as a processor(s) 1204 of a wireless device 1202 that is a UE, as described herein). These instructions may be, for example, located in the processor and/or on a memory of the UB (such as a memory 1206 of a wireless device 1202 that is a UE, as described herein).

In some cases, a DSDA UE may (directly) regulate data subscriber transmissions. For example, it may be that for heavy UL throughput cases that may apply to the data subscriber (such as being associated with traffic of a non-guaranteed bit rate (NGBR)), latency concerns are relatively minimized, and it may be reasonable to regulate periods during which the data subscriber is permitted to transmit. For example, the data subscriber could be regulated such that it does not attempt to transmit during a transmission duration for a voice subscriber. Accordingly, the data subscriber and the voice subscriber would not be directly competing for the physical transmission resources of the DSDA UE.

The UE may first locate a transmission duration associated with the voice subscriber. In some cases, the determined transmission duration aligns to/corresponds to a voice subscriber periodicity used at the UE, as previously described. For example, in the case of a voice subscriber periodicity of 40 ms, there may be one transmission duration for every 40 ms. Then, for example, the UE may determine a time of a first transmission to be made by the UE during the voice subscriber periodicity and a last transmission to be made by the UE during the voice subscriber periodicity, and determine that the transmission duration is located between these two events. In other cases, it may be that the UE determines that, for example, the transmission duration corresponds to an entire prioritized period for the voice subscriber, as described previously.

Then, during a SR occasion for the data subscriber, and while performing PUSCH assembly for a transmission on the data subscriber, the UE may predict whether next UL slot(s) that would be scheduled for UL transmission on the data subscriber fall into the location of the transmission duration for the voice subscriber. The location of the next UL slot(s) may be determined by the UE by using the formula:

$$\text{Later UL slot} = \text{current slot} + m \text{ slot offset for network uplink processing} + n \text{ slots for scheduling offset}$$

where m and n are known values at the UE.

If the location of the later UL slot falls within the location of the transmission duration for the first subscriber, the UE sets a BSR report to be sent for the data subscriber (e.g., associated with the current PUSCH assembly) to zero. This may indicate to the base station for the data subscriber that there is no (more) transmission data to be sent by the data subscriber. This BSR may be sent even in the case that there is indeed more data to be sent by the data subscriber. The result of sending such a BSR may be that the network for the data subscriber accordingly does not schedule, corresponding to the SR occasion, the UL slot that would have otherwise fallen within the location of the transmission duration of the voice subscriber of the UE. Accordingly, any potential collision that may have otherwise occurred if such an UL slot was scheduled is avoided.

The UE then later recovers UL scheduling for the data subscriber using a SR during a later SR occasion. During each SR occasion, the UE calculates where the corresponding PUSCH that would be scheduled by a SR sent during that SR occasions drops into a transmission duration for the voice subscriber (whether this be the transmission duration that was avoided by sending the BSR, or a subsequent transmission duration for the voice subscriber). The location of the corresponding PUSCH for the SR occasion may be determined by the UE using the formula:

$$\text{PUSCH slot} = \text{SR occasion slot} + x \text{ slot scheduling latency} + y \text{ slot scheduling offset where } x \text{ and } y \text{ are known values at the UE.}$$

Figure 5:
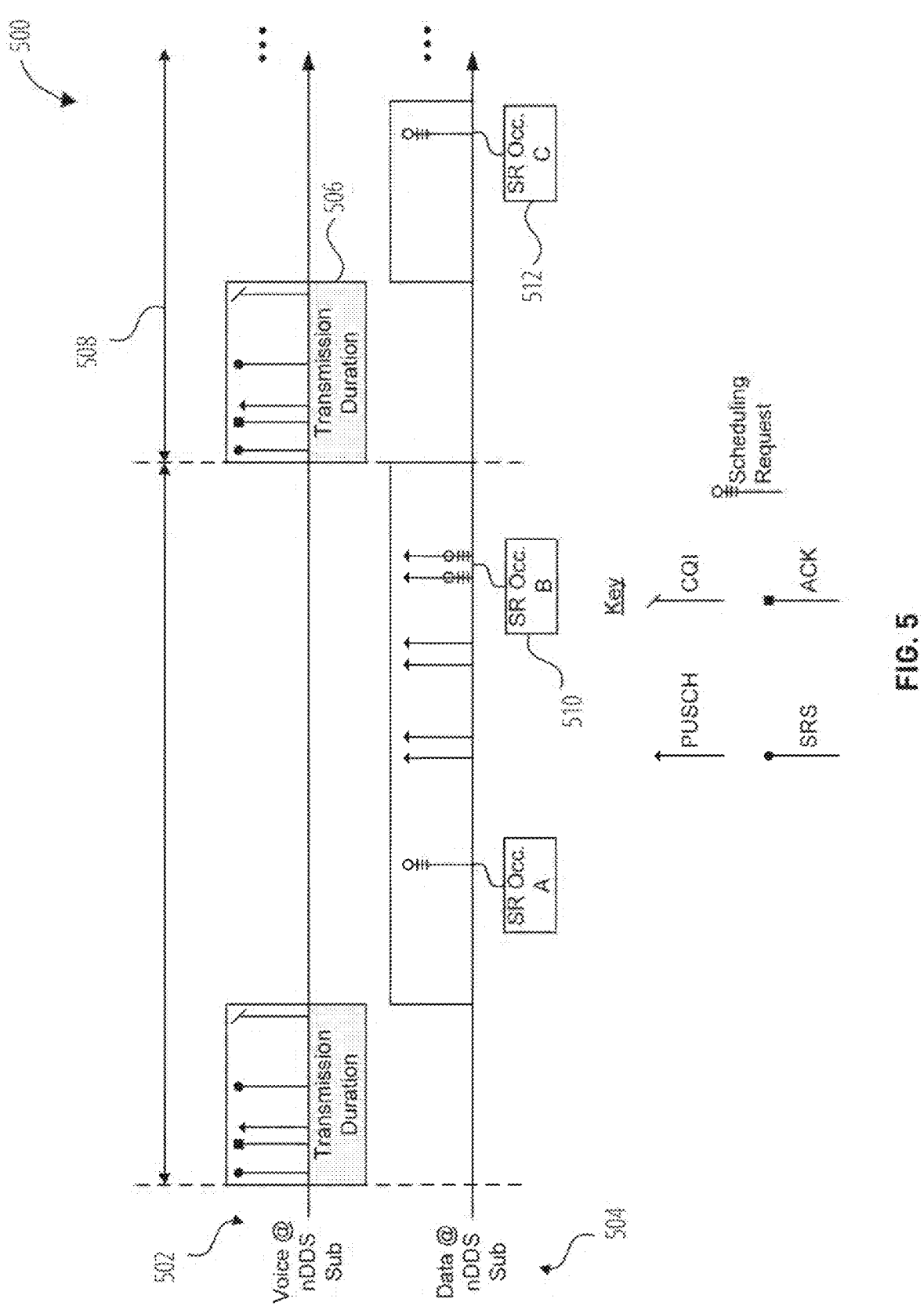
FIG. 5 illustrates a diagram of DSDA UE behavior according to a voice subscriber and a data subscriber, according to an embodiment.

FIG. 5 illustrates a diagram 500 of DSDA UE behavior according to a voice subscriber 502 and a data subscriber 504, according to an embodiment. As previously described, by the time of the SR occasion B 510, the UE locates the transmission duration 506 within the period 508 of the voice subscriber 502 periodicity. The UE then determines that a PUSCH scheduled in response to a SR on the SR occasion B 510 would be scheduled during the transmission duration 506. Accordingly, during PUSCH assembly (e.g., for the illustrated PUSCHs during the SR occasion B 510), the UE prepares a BSR reporting that the data subscriber 504 has no data to send to the network of the data subscriber 504. In response to receipt of the BSR, no UL scheduling for the data subscriber 504 is performed by the network for the data subscriber 504 during the transmission duration 506. During a subsequent SR occasion C 512, an SR is sent by the UE to the network for the data subscriber 504 in order to recover UL scheduling for the data subscriber 504.

In such cases, the throughput loss on the data subscriber may depend on a configuration for an SR period used at the UE. For example, with an SR period of 20 ms, the throughput loss may be relieved from around 99% (as previously described) down to around 75%. Smaller SR periods may have better performance. The root cause of this improvement may be that, when UL scheduling for the data subscriber avoids transmission duration(s) for the voice subscriber, collisions are avoided, and thus there is no corresponding BLER perceived at the network for the data subscriber. Accordingly, no MCS penalty is applied for the data subscriber by the network for the data subscriber. As described, an SR to recover UL scheduling may be used.

FIG. 6 illustrates a method 600 of a UE implementing a DSDA mode, according to an embodiment. The method 600 comprises locating 602 a first transmission duration for a first subscriber of the UE.

The method 600 further comprises determining 604 that a slot for transmission data of a second subscriber overlaps with the first transmission duration for the first subscriber.

The method 600 further comprises sending 606 a buffer status report (BSR) indicating that the second subscriber has no transmission data.

The method 600 further comprises sending 608, after the first transmission duration, a scheduling request for a UL grant for use to send the transmission data.

In some embodiments of the method 600, the determining that the slot for the transmission data overlaps with the first transmission duration comprises adding a network uplink processing slot offset and a scheduling slot offset to a location of a current slot.

In some embodiments, the method 600 further includes determining that the UL grant for use by the second subscriber does not overlap a second transmission duration for the first subscriber prior to sending the scheduling request. In some such embodiments, the determining that the UL grant does not overlap the second transmission duration for the first subscriber comprises adding a scheduling slot latency and a scheduling slot offset to a location of a slot used to send the scheduling request.

In some embodiments of the method 600, the first transmission duration is located according to a transmission periodicity used by the first subscriber.

In some embodiments of the method 600, the first subscriber is a voice subscriber and the second subscriber is a data subscriber.

Embodiments contemplated herein include an apparatus comprising means to perform one or more elements of the method 600. This apparatus may be, for example, an apparatus of a UE (such as a wireless device 1202 that is a UE, as described herein).

Embodiments contemplated herein include one or more non-transitory computer-readable media comprising instructions to cause an electronic device, upon execution of the instructions by one or more processors of the electronic device, to perform one or more elements of the method 600. This non-transitory computer-readable media may be, for example, a memory of a UE (such as a memory 1206 of a wireless device 1202 that is a UE, as described herein).

Embodiments contemplated herein include an apparatus comprising logic, modules, or circuitry to perform one or more elements of the method 600. This apparatus may be, for example, an apparatus of a UE (such as a wireless device 1202 that is a UE, as described herein).

Embodiments contemplated herein include an apparatus comprising: one or more processors and one or more computer-readable media comprising instructions that, when executed by the one or more processors, cause the one or more processors to perform one or more elements of the method 600. This apparatus may be, for example, an apparatus of a UE (such as a wireless device 1202 that is a UE, as described herein).

Embodiments contemplated herein include a signal as described in or related to one or more elements of the method 600.

Embodiments contemplated herein include a computer program or computer program product comprising instructions, wherein execution of the program by a processor is to cause the processor to carry out one or more elements of the method 600. The processor may be a processor of a UE (such as a processor(s) 1204 of a wireless device 1202 that is a UE, as described herein). These instructions may be, for example, located in the processor and/or on a memory of the UE (such as a memory 1206 of a wireless device 1202 that is a UE, as described herein).

In some cases, a DSDA UE may reduce (partial) transmissions on the voice subscriber. For example, it may be recognized that while voice subscriber packets may in cases have priority over data subscriber packets (e.g., because of latency concerns), it may also be the case that voice traffic can use a relatively lower throughput to achieve acceptable service than a throughput for the data subscriber that may be deemed acceptable. Accordingly, it may be reasonable to make a trade off (from a performance point of view) between the throughput performance on the voice subscriber and the throughput performance of the data subscriber in order to reduce blanking on the data subscriber due to collision.

In such an event, it may be advantageous to drop partial SRS, CQI, and/or ACK transmissions on the voice subscriber, with the result that there are fewer opportunities for collision between the voice subscriber and the data subscriber. First, the UE may determine that transmission data for the voice subscriber collides with transmission data for the data subscriber. This may be accomplished in various ways. For example, the UE may compare an UL-DL slot configuration for each of the voice subscriber and the data subscriber. Additionally or alternatively, the UE may compare a timing offset and/or timing advance of one of the subscribers to the other subscriber. Additionally or alternatively, the UE may compare one or more of an SRS configuration and a CQI configuration for one of the subscribers to the configuration for the same signal on the other of the subscribers.

Once it is determined that there may be a collision between the voice subscriber and the data subscriber, the UE may determine to drop one or more signals to be transmitted by the voice subscriber in order to avoid that collision. For example, the voice subscriber may drop SRS resources that collide with transmission data for the data subscriber. In the case of a codebook SRS and/or a non-codebook SRS, the voice subscriber may transmit such SRS with a duty cycle (e.g., drop one or more such SRS on a periodic basis, in the case that it is determined that the dropped SRS may cause a collision) instead of transmitting every such SRS, thereby reducing the number of collisions. Additionally or alternatively, the UE could drop any SRS for antenna switching that may cause a collision.

In some cases, the UE may drop a CQI transmission for the voice subscriber that collides with transmission data for the data subscriber. For example, if a precoder matrix indicator (PMI) of a CQI to be transmitted by the UE on the voice subscriber that collides with transmission data for the data subscriber is the same as a previously transmitted PMI on the voice subscriber, the voice subscriber may drop the CQI.

In some cases, the UE may drop an ACK for the voice subscriber that collides with transmission data for the data subscriber. In these circumstances, the UE may track the DL BLER for the voice subscriber over a duration of or window prior (and up to) the current time. The UE may then determine whether the DL BLER for the voice subscriber is lower than a BLER threshold for the voice subscriber that is known at/configured to the UE and, if so, whether the UE can drop the ACK without exceeding this threshold. The purpose of remaining under this threshold is to prevent any BLER perceived by the network to get so high as to cause the network to lower the MCS level of the voice subscriber. Accordingly, the BLER threshold used by the UE may be the same as the BLER threshold used by the network of the voice subscriber to control the MCS, or it may be a lower value (e.g., to provide a buffer zone against the value used by the network). When these conditions are met, the UE may drop the ACK in order to avoid the collision with the transmission data for the data subscriber.

Note that while the network for the voice subscriber may respond to the lack of an ACK by retransmitting the voice signaling corresponding to the ACK at a later time, this does not actually impact voice quality (because the original transmission of that signaling was received at the UE on time in any event).

For example, in a case where the voice subscriber and the data subscriber use the n41 frequency band, the slot-wise blanking rate may be relieved from 25% to 12.5%, In a case where the voice subscriber and the data subscriber use the n78 frequency band, the slot-wise blanking rate may be relieved from 20.8% to 12.5%. In such cases, a corresponding reduction in the rate of blanking of transmissions on the data subscriber could accordingly help to relieve a throughput loss for the data subscriber. Further, the data subscriber may also experience reduced UL latency.

Figure 7:
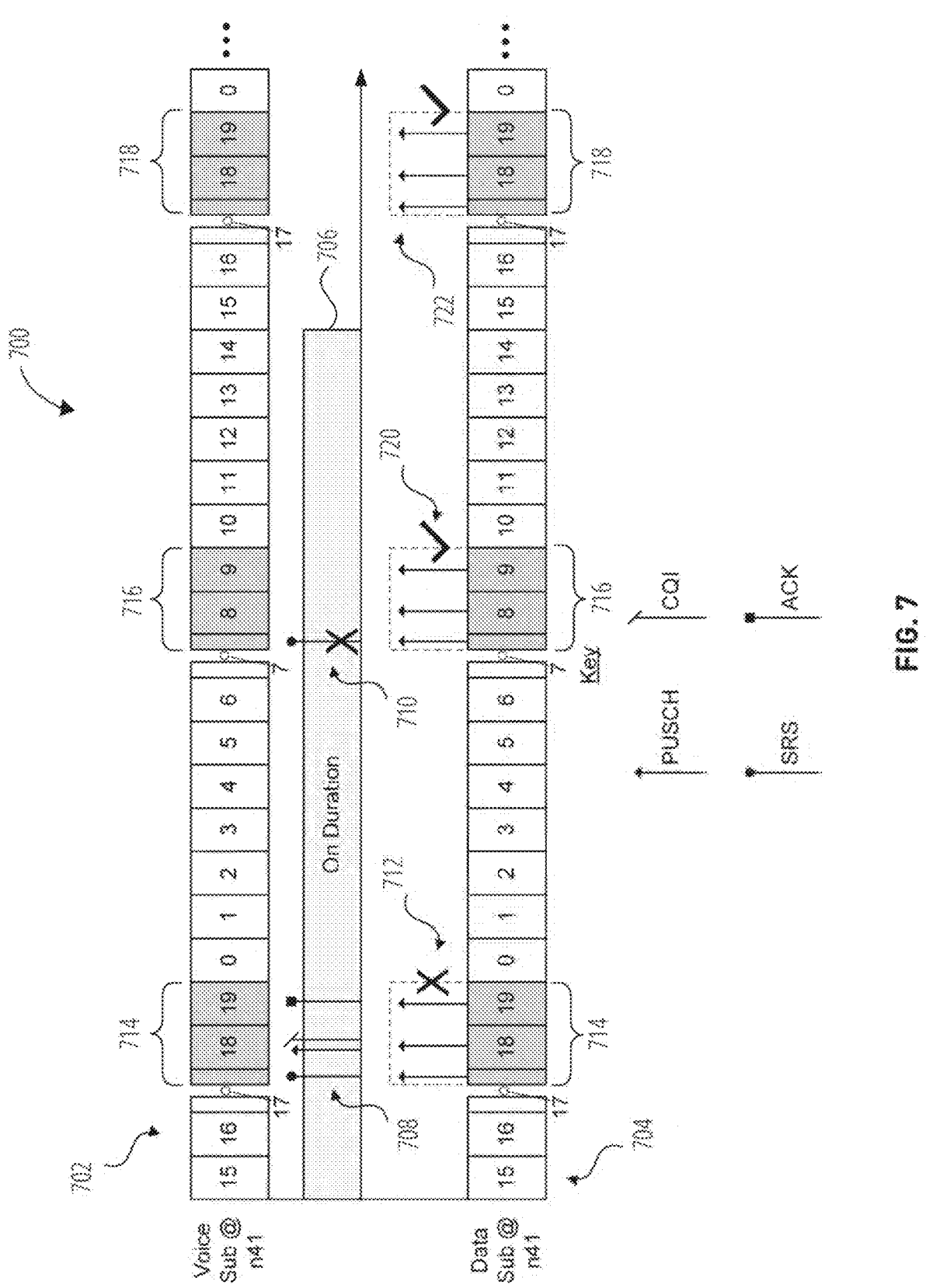
FIG. 7 illustrates a diagram showing UE activity on slots located on each of a voice subscriber and a data subscriber, according to an embodiment.

FIG. 7 illustrates a diagram 700 showing UE activity on slots located on each of a voice subscriber 702 and a data subscriber 704, according to an embodiment. The embodiment of FIG. 7 corresponds to the use of the n41 frequency band by the UE. In FIG. 7, slots for UL use are shaded grey.

The embodiment of FIG. 7 represents and adjustment relative to the embodiment described in relation to FIG. 2. Accordingly, the voice subscriber 702 and the data subscriber 704 of FIG. 7 respectively correspond to the voice subscriber 202 and the data subscriber 204 of FIG. 2. The first UL slots 714, the second UL slots 716, and the third UL slots 718 of FIG. 7 respectively correspond to the first UL slots 214, the second UL slots 716, and the third UL slots 718 of FIG. 2. The prioritized period 706 of FIG. 7 corresponds to the prioritized period 206 of FIG. 2. The first transmission data 708, second transmission data 710, the third transmission data 712, the fourth transmission data 720, and the fifth transmission data 722 respectively correspond to the first transmission data 208, the second transmission data 210, the third transmission data 212, the fourth transmission data 220, and the fifth transmission data 222 of FIG. 2.

Differently than FIG. 2, as illustrated, in the second transmission data 710, the illustrated SRS has been dropped (represented by the "X"), according to methods of transmission reduction for the voice subscriber as described herein. Accordingly, because the SRS from the second transmission data 710 is dropped, there is no corresponding state of collision between the second transmission data 710 and the fourth transmission data 720 (e.g., as was described in relation to the second transmission data 210 and the fourth transmission data 220 of FIG. 2). The data subscriber 704 can therefore use the second UL slots 716 to send the fourth transmission data 720.

In the embodiment of FIG. 7, the prioritized period 706 may be 10 ms long and repeat every 40 ms. In such a case, it can be determined (by extending the pattern of the data subscriber 704 through the entire 40 ms) that there would be a total of 16 (full) slots during which PUSCH transmissions are attempted, during which 2 have their transmissions blanked due to collision (as illustrated). Accordingly, the slot-wise blanking rate for the embodiment of FIG. 7 may be 2 out of 16 (or 12.5%). This represents an improvement over the 25% slot-wise blanking rate of FIG. 2. In such cases, the BLER determined by the network is accordingly reduced, and the MCS penalty may be correspondingly either not applied, or, in the case that the determined BLER still exceeds the network's BLER threshold (but by a lesser amount), the MCS penalty may not be as severe as in the case of FIG. 2 (which may provide relief for, e.g., traffic of a sporadic nature on the data subscriber).

While FIG. 7 has been illustrated in the case of radio frames having 20 slots, it is contemplated that similar principles would be analogously applicable in cases where a different numerology is used.

Figure 8:
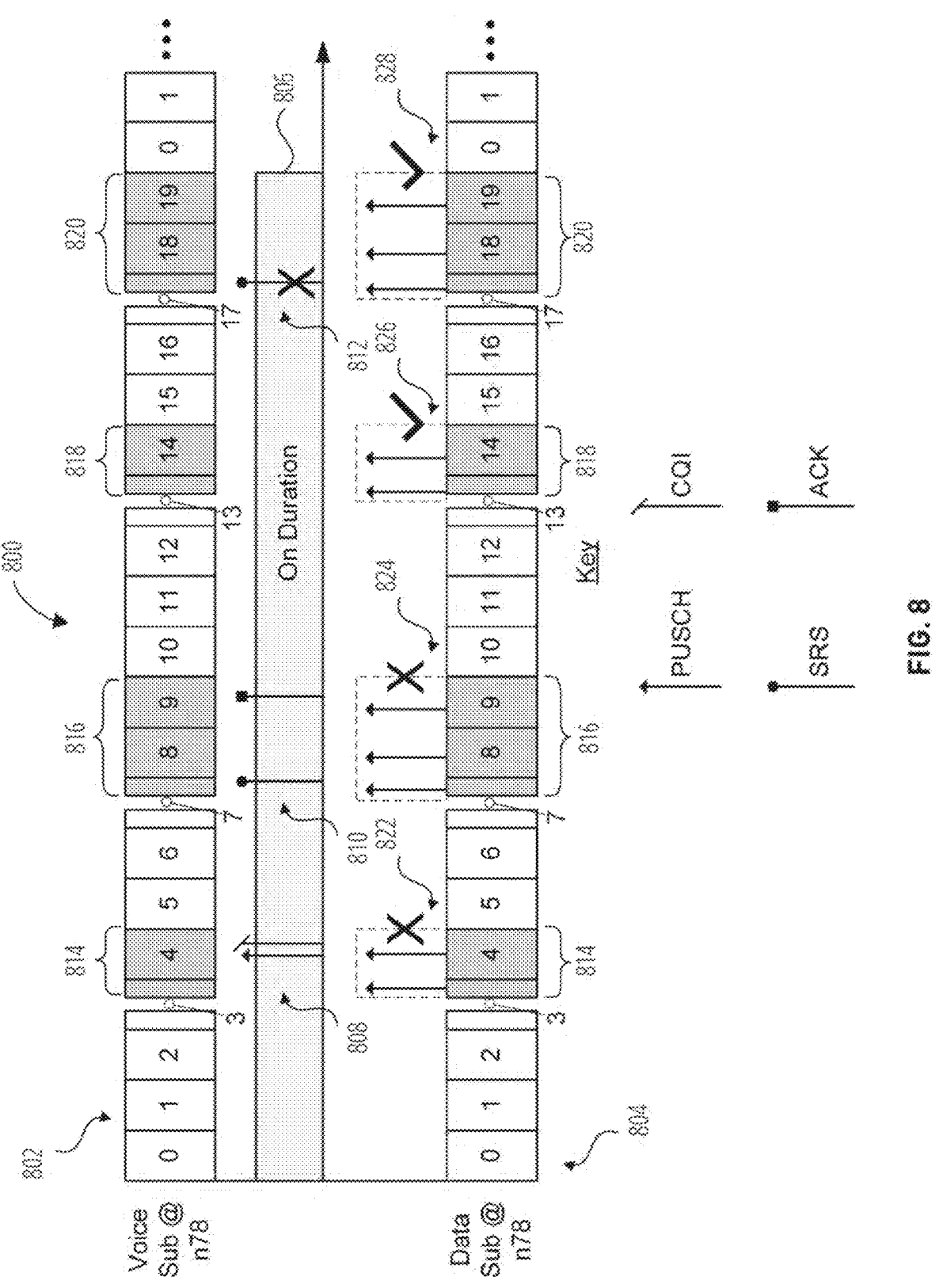
FIG. 8 illustrates a diagram showing UE activity on slots located on each of a voice subscriber and a data subscriber, according to an embodiment.

FIG. 8 illustrates a diagram 800 showing UE activity on slots located on each of a voice subscriber 802 and a data subscriber 804, according to an embodiment. The embodiment of FIG. 8 corresponds to the use of the n41 frequency band by the UE. In FIG. 8, slots for UL use are shaded grey.

The embodiment of FIG. 8 represents and adjustment relative to the embodiment described in relation to FIG. 3. Accordingly, the voice subscriber 802 and the data subscriber 804 of FIG. 8 respectively correspond to the voice subscriber 302 and the data subscriber 304 of FIG. 3. The first UL slots 814, the second UL slots 816, the third UL slots 818, and the fourth UL slots 820 of FIG. 8 respectively correspond to the first UL slots 314, the second UL slots 316, the third UL slots 318, and the fourth UL slots 320 of FIG. 3. The prioritized period 806 of FIG. 8 corresponds to the prioritized period 306 of FIG. 3. The first transmission data 808, second transmission data 810, the third transmission data 812, the fourth transmission data 822, the fifth transmission data 824, the sixth transmission data 826, and the seventh transmission data 828 respectively correspond to the first transmission data 308, the second transmission data 310, the third transmission data 312, the fourth transmission data 322, the fifth transmission data 324, the sixth transmission data 326, and the seventh transmission data 328 of FIG. 3.

Differently than FIG. 3, as illustrated, in the third transmission data 812, the illustrated SRS has been dropped (represented by the "X"), according to methods of transmission reduction for the voice subscriber as described herein. Accordingly, because the SRS from the third transmission data 812 is dropped, there is no corresponding state of collision between the third transmission data 812 and the seventh transmission data 828 (e.g., as was described in relation to the third transmission data 312 and the seventh transmission data 328 of FIG. 3). The data subscriber 804 can therefore use the fourth UL slots 820 to send the seventh transmission data 828.

In the embodiment of FIG. 8, the prioritized period 806 may be 10 ms long and repeat every 40 ms. In such a case, it can be determined (by extending the pattern of the data subscriber 804 through the entire 40 ms) that there would be a total of 24 (full) slots during which PUSCH transmissions are attempted, during which 3 have their transmissions blanked due to collision (as illustrated). Accordingly, the slot-wise blanking rate for the embodiment of FIG. 7 may be 3 out of 24 (or 12.5%). This represents an improvement over the 20.8% slot-wise blanking rate of FIG. 3. In such cases, the BLER determined by the network is accordingly reduced, and the MCS penalty may be correspondingly either not applied, or, in the case that the determined BLER still exceeds the network's BLER threshold (but by a lesser amount), the MCS penalty may not be as severe as in the case of FIG. 3 (which may provide relief for, e.g., traffic of a sporadic nature on the data subscriber).

While FIG. 8 has been illustrated in the case of radio frames having 20 slots, it is contemplated that similar principles would be analogously applicable in cases where a different numerology is used.

Figure 9:
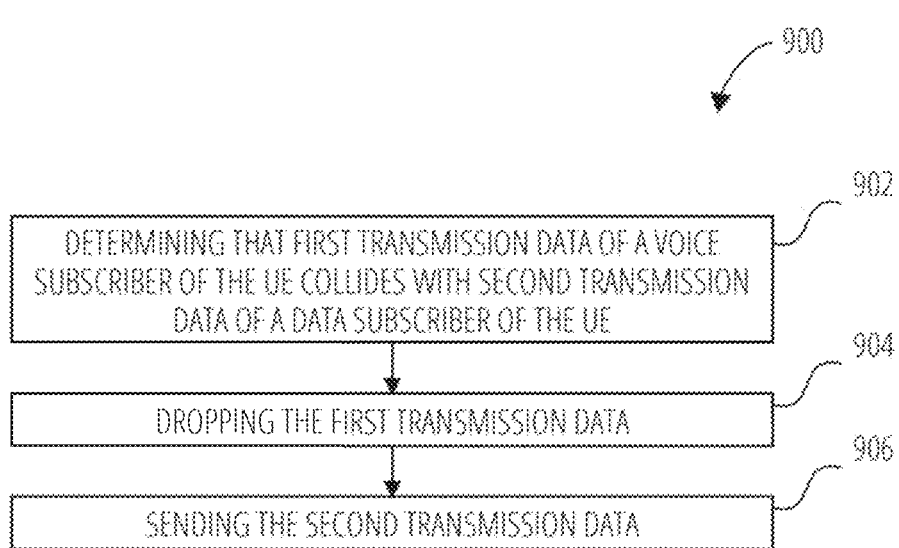
FIG. 9 illustrates a method of a UE implementing a DSDA mode, according to an embodiment.

FIG. 9 illustrates a method 900 of a UE implementing a DSDA mode, according to an embodiment. The method 900 includes determining 902 that first transmission data of a voice subscriber of the UE collides with second transmission data of a data subscriber of the UE.

The method 900 includes dropping 904 the first transmission data.

The method 900 includes sending 906 the second transmission data.

In some embodiments of the method 900, determining that the first transmission data collides with the second transmission data comprises comparing a first UL-downlink (DL) configuration of the voice subscriber with a second UL-DL configuration of the data subscriber.

In some embodiments of the method 900, the first transmission data is for a first cell and the second transmission data is for a second cell, and determining that the first transmission data collides with the second transmission data comprises determining that a timing offset between the first cell and the second cell at the UE causes a first slot on the first cell for the first transmission data to overlap a second slot on the second cell for the second transmission data.

In some embodiments of the method 900, the first transmission data comprises one of a codebook SRS or a non-codebook SRS, and wherein the first transmission data is dropped according to a duty cycle.

In some embodiments of the method 900, the first transmission data comprises an antenna SRS.

In some embodiments of the method 900, the first transmission data comprises a CQI, and wherein a PMI determined by the UE is the same as a previous PMI reported by the UE.

In some embodiments of the method 900, the first transmission data comprises an ACK, and a current BLER determined by the UE is lower than a threshold.

Embodiments contemplated herein include an apparatus comprising means to perform one or more elements of the method 900 This apparatus may be, for example, an apparatus of a UE (such as a wireless device 1202 that is a UE, as described herein).

Embodiments contemplated herein include one or more non-transitory computer-readable media comprising instructions to cause an electronic device, upon execution of the instructions by one or more processors of the electronic device, to perform one or more elements of the method 900. This non-transitory computer-readable media may be, for example, a memory of a UE (such as a memory 1206 of a wireless device 1202 that is a UE, as described herein).

Embodiments contemplated herein include an apparatus comprising logic, modules, or circuitry to perform one or more elements of the method 900. This apparatus may be, for example, an apparatus of a UE (such as a wireless device 1202 that is a UE, as described herein).

Embodiments contemplated herein include an apparatus comprising: one or more processors and one or more computer-readable media comprising instructions that, when executed by the one or more processors, cause the one or more processors to perform one or more elements of the method 900. This apparatus may be, for example, an apparatus of a UE (such as a wireless device 1202 that is a UE, as described herein).

Embodiments contemplated herein include a signal as described in or related to one or more elements of the method 900.

In some cases, a DSDA UE may operate in such a manner that the first subscriber and the second subscriber operate within the same band provided by the same network operator. Such cases may involve the use of physical transmissions from only one of the first subscriber and the second subscriber at a time due to the presence at the UE of a single PA for the associated band group and/or intermodulation distortion that would otherwise occur if both subscribers were to transmit simultaneously, in the manner described above.

In these circumstances, it may be advantageous for the UE to insure that the first subscriber and the second subscriber remain camped to the same cell. The use of the same cell may cause there to be alignment as to the understanding of the location of the slots at each of the first subscriber and the second subscriber, as when these use the same serving cell (and thus experience the same signal propagation times) there is no use for a relative timing difference between the two (e.g., such as that caused by the timing advance 108 in the embodiment of FIG. 1). Further, when using the same cell it may be possible to configure the first subscriber and the second subscriber such that there may be no need to perform RF tuning upon switching between transmissions for the first subscriber and the second subscriber. Accordingly, collisions between transmission data for the first subscriber and transmission data for the second subscriber that would otherwise occur due to slot overlap and/or RF tuning may be reduced or eliminated.

In some cases, in order support use of the same cell by the first subscriber and the second subscriber, the UE may configure each of the first subscriber and the second subscriber to use separate protocol stacks. In such a case, the UE may maintain a separate logical UE identity, a separate RRC-L2 entity, and/or separate physical parameters (like configurations for bandwidth parts (BWPs). SRs, channel state feedback (CSF), SRSs, channel state information reference signals (CSI-RSs), etc.) associated with each of the first subscriber and the second subscriber. It may be that, in such cases, the first subscriber and the second subscriber may use the same physical cell identity (PCI), the same timing-frequency tracking and adjustment results, and/or the same power control profiles.

In some cases, in order to support use of the same cell by the first subscriber and the second subscriber, the UE may insure the use of the same DL reference timing and/or UL tracking area/tracking area adjustment for each of the first subscriber and the second subscriber. For example, it may be that the second subscriber follows any downlink timing drifting that occurs for the first subscriber. It may also and/or alternatively be that the second subscriber follows the tracking area code (TAC) configuration of the first subscriber. It may be that the second subscriber ignores any TAC change indicated for the second subscriber that may be indicated by the network. Further, if a random access channel (RACH) procedure is triggered on the first subscriber, each of the first subscriber and the second subscriber reset their tracking areas and follow the TAC configuration provided in msg2 of the RACH procedure on the first subscriber. The second subscriber then subsequently follows the TAC configuration for the first subscriber, as described.

In some cases, in order to support the use of the same cell by the first subscriber and the second subscriber, the UE may insure that whenever a handover command is received that causes a first subscriber to hand over to a target cell, an RRC connection reestablishment procedure is triggered for the second subscriber, such that the second subscriber also uses the target cell.

In some cases, in order to support the use of the same cell by the first subscriber and the second subscriber, the UE may insure that the second subscriber follows the transmission power control (TPC) configuration for the first subscriber, and ignores any indication from the network of the second subscriber to change the TPC configuration for the second subscriber. Further, if a RACH procedure is triggered on the first subscriber, each of the first subscriber and the second subscriber reset their TPC configurations according to the messaging in that RACH procedure. The second subscriber then subsequently follows the TPC configuration for the first subscriber, as described.

In some cases, in order to support the use of the same cell by the first subscriber and the second subscriber, the UE may perform channel multiplexing between the two subscribers. For example, SRSs, physical uplink control channels (PUCCHs), PUSCHs. and/or PUCCHs and PUSCHs for each of the subscribers may be multiplexed together.

FIG. 10 illustrates a method 1000 of a UB implementing a DSDA mode, according to an embodiment. The method 1000 includes providing 1002 a first protocol stack for a first subscriber and a second protocol stack for a second subscriber.

The method 1000 further includes insuring 1004 that a DL reference timing used by the first subscriber is used by the second subscriber.

The method 1000 further includes insuring 1006 that a tracking area used by the first subscriber is used by the second subscriber.

The method 1000 further includes performing 1008, in response to receiving a handover command to a target cell for the first subscriber, an RRC reconnection procedure to establish the second subscriber on the target cell.

The method 1000 further includes insuring 1010 that a TPC configuration used by the first subscriber is used by the second subscriber.

The method 1000 further includes multiplexing 1012 one or more channels of the second subscriber with the same one or more channels of the first subscriber.

In some embodiments of the method 1000, the first protocol stack includes a first configuration for one or more of a first BWP, a first SR, first CSF, a first SRS, and/or a first CSI-RS, and the second protocol stack includes a second configuration for one or more of a second BWP, a second SR, second CSF, a second SRS, and/or a second CSI-RS.

In some embodiments of the method 1000, insuring 1006 that a tracking area used by the first subscriber is used by the second subscriber comprises causing the second subscriber to follow a TAC configuration provided in a RACH procedure for the first subscriber.

In some embodiments of the method 1000, insuring 1010 that a TPC configuration used by the first subscriber is used by the second subscriber comprises causing the second subscriber to follow a TPC configuration provided in a RACH procedure for the first subscriber.

In some embodiments of the method 1000, the one or more channels comprises one or more of an SRS, a PUCCH, a PUSCH, and/or a PUCCH and a PUSCH.

Figure 11:
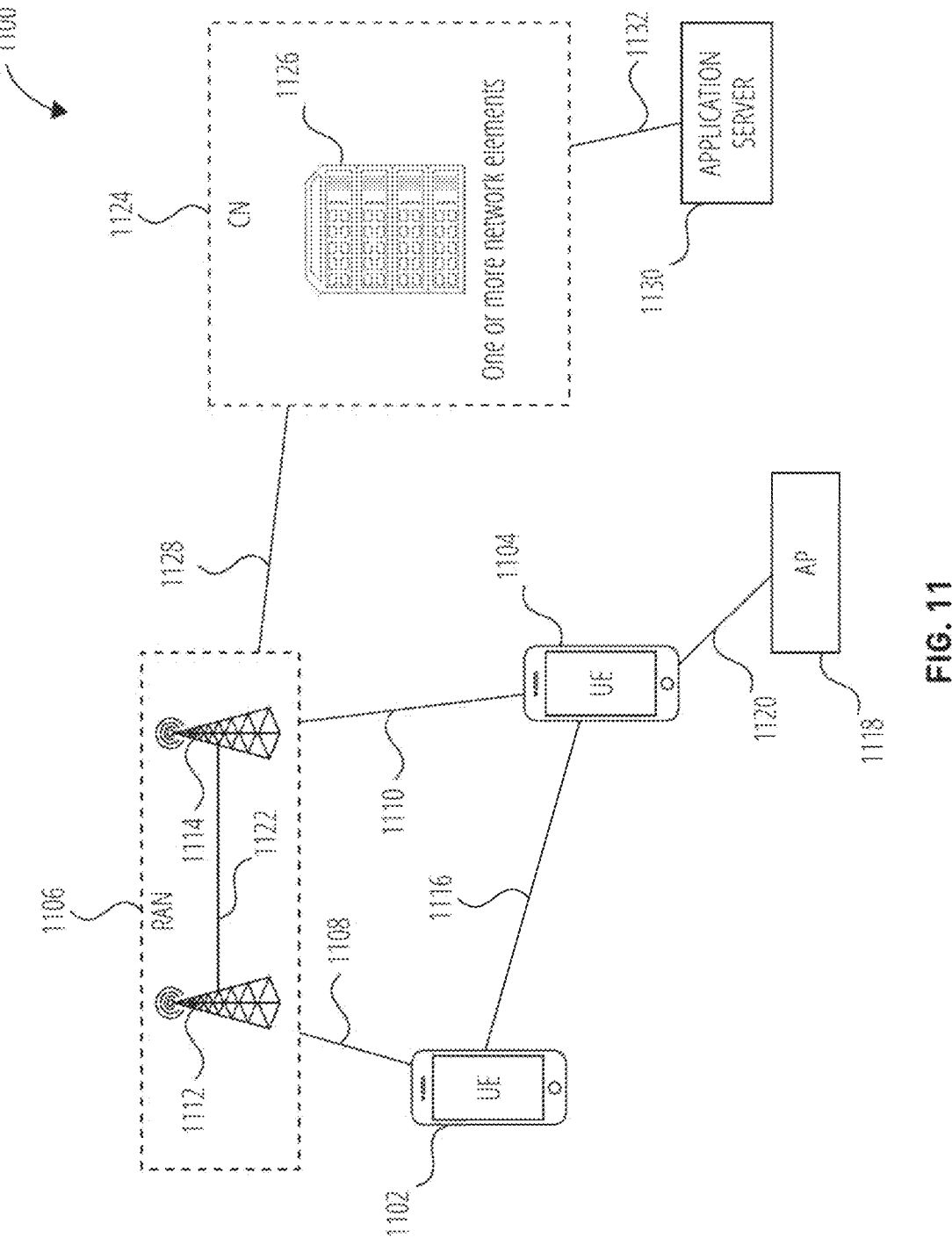
FIG. 11 illustrates an example architecture of a wireless communication system, according to embodiments disclosed herein.

FIG. 11 illustrates an example architecture of a wireless communication system 1100, according to embodiments disclosed herein. The following description is provided for an example wireless communication system 1100 that operates in conjunction with the LTE system standards and/or 5G or NR system standards as provided by 3GPP technical specifications.

As shown by FIG. 11, the wireless communication system 1100 includes UE 1102 and UE 1104 (although any number of UEs may be used). In this example, the UE 1102 and the UE 1104 are illustrated as smartphones (e.g., handheld touchscreen mobile computing devices connectable to one or more cellular networks), but may also comprise any mobile or non-mobile computing device configured for wireless communication. Either of the UE 1102 and/or the UE 1104 may be a DSDA UE, as described herein.

The UE 1102 and UE 1104 may be configured to communicatively couple with a RAN 1106. In embodiments, the RAN 1106 may be NG-RAN, E-UTRAN, etc. The UE 1102 and UE 1104 utilize connections (or channels) (shown as connection 1108 and connection 1110, respectively) with the RAN 1106, each of which comprises a physical communications interface. The RAN 1106 can include one or more base stations, such as base station 1112 and base station 1114, that enable the connection 1108 and connection 1110.

In this example, the connection 1108 and connection 1110 are air interfaces to enable such communicative coupling, and may be consistent with RAT(s) used by the RAN 1106, such as, for example, an LTE and/or NR.

In some embodiments, the UE 1102 and UE 1104 may also directly exchange communication data via a sidelink interface 1116. The UE 1104 is shown to be configured to access an access point (shown as AP 1118) via connection 1120. By way of example, the connection 1120 can comprise a local wireless connection, such as a connection consistent with any IEEE 602.11 protocol, wherein the AP 1118 may comprise a Wi-Fi router. In this example, the AP 1118 may be connected to another network (for example, the Internet) without going through a CN 1124.

In embodiments, the UE 1102 and UE 1104 can be configured to communicate using orthogonal frequency division multiplexing (OFDM) communication signals with each other or with the base station 1112 and/or the base station 1114 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 1112 or base station 1114 may be implemented as one or more software entities running on server computers as part of a virtual network. In addition, or in other embodiments, the base station 1112 or base station 1114 may be configured to communicate with one another via interface 1122. In embodiments where the wireless communication system 1100 is an LTE system (e.g., when the CN 1124 is an EPC), the interface 1122 may be an X2 interface. The X2 interface may be defined between two or more base stations (e.g., two or more eNBs and the like) that connect to an EPC, and/or between two eNBs connecting to the EPC. In embodiments where the wireless communication system 1100 is an NR system (e.g., when CN 1124 is a 5GC), the interface 1122 may be an Xn interface. The Xn interface is defined between two or more base stations (e.g., two or more gNBs and the like) that connect to 5GC, between a base station 1112 (e.g., a gNB) connecting to 5GC and an eNB, and/or between two eNBs connecting to 5GC (e.g., CN 1124).

The RAN 1106 is shown to be communicatively coupled to the CN 1124. The CN 1124 may comprise one or more network elements 1126, which are configured to offer various data and telecommunications services to customers/subscribers (e.g., users of UE 1102 and UE 1104) who are connected to the CN 1124 via the RAN 1106. The components of the CN 1124 may be implemented in one physical device or separate physical devices including components to read and execute instructions from a machine-readable or computer-readable medium (e.g., a non-transitory machine-readable storage medium).

In embodiments, the CN 1124 may be an EPC, and the RAN 1106 may be connected with the CN 1124 via an S1 interface 1128. In embodiments, the S1 interface 1128 may be split into two parts, an S1 user plane (S1-U) interface, which carries traffic data between the base station 1112 or base station 1114 and a serving gateway (S-GW), and the S1-MME interface, which is a signaling interface between the base station 1112 or base station 1114 and mobility management entities (MMEs).

In embodiments, the CN 1124 may be a 5GC, and the RAN 1106 may be connected with the CN 1124 via an NG interface 1128. In embodiments, the NO interface 1128 may be split into two parts, an NG user plane (NG-U) interface, which carries traffic data between the base station 1112 or base station 1114 and a user plane function (UPF), and the SI control plane (NG-C) interface, which is a signaling interface between the base station 1112 or base station 1114 and access and mobility management functions (AMFs).

Generally, an application server 1130 may be an element offering applications that use internet protocol (IP) bearer resources with the CN 1124 (e.g., packet switched data services). The application server 1130 can also be configured to support one or more communication services (e.g., VoIP sessions, group communication sessions, etc.) for the UE 1102 and UE 1104 via the CN 1124. The application server 1130 may communicate with the CN 1124 through an IP communications interface 1132.

Figure 12:
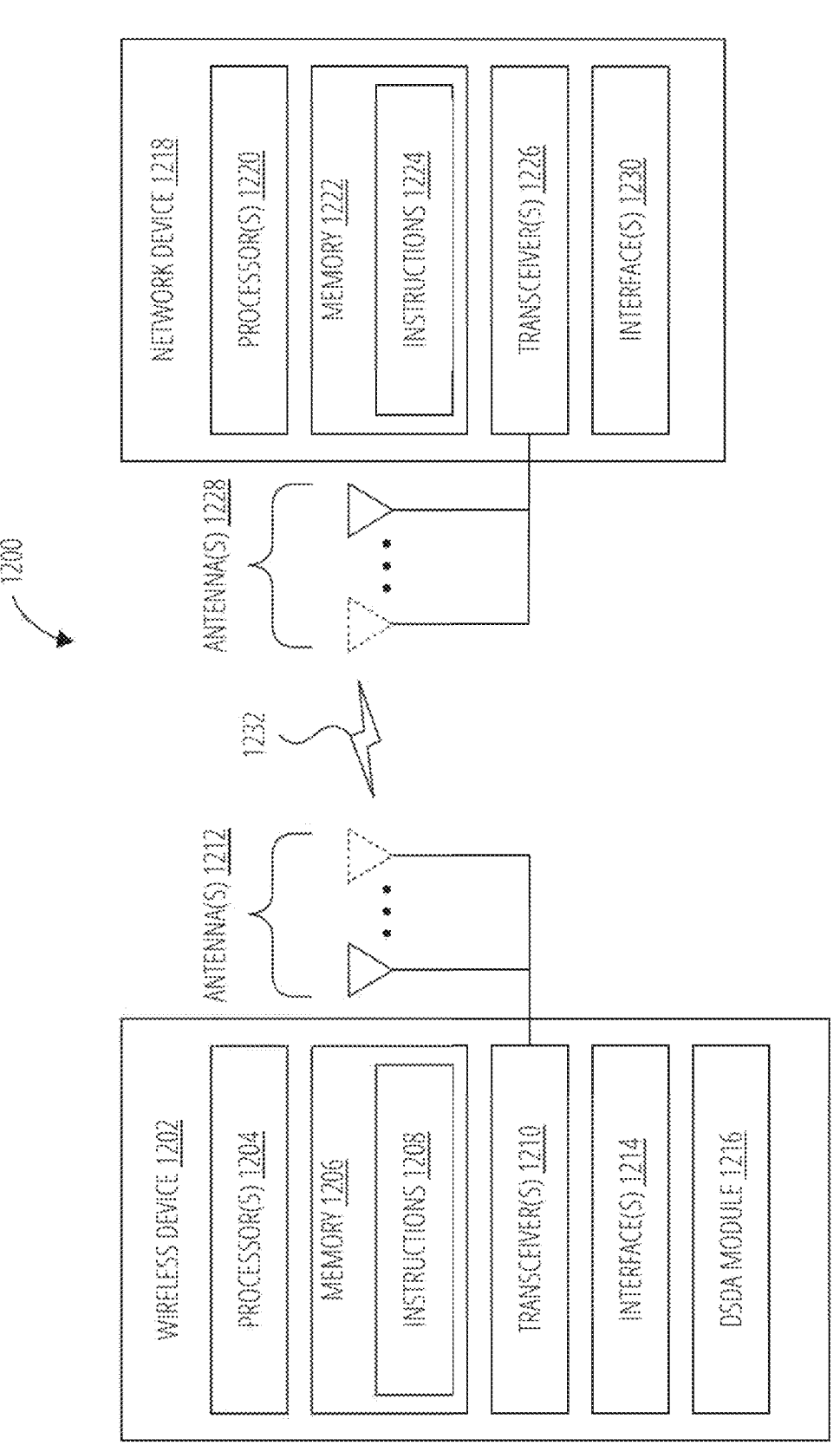
FIG. 12 illustrates a system for performing signaling between a wireless device and a network device, according to embodiments disclosed herein.

FIG. 12 illustrates a system 1200 for performing signaling 1232 between a wireless device 1202 and a network device 1218, according to embodiments disclosed herein. The system 1200 may be a portion of a wireless communications system as herein described. The wireless device 1202 may be, for example, a UE (e.g., a DSDA UE) of a wireless communication system. The network device 1218 may be, for example, a base station (e.g., an eNB or a gNB) of a wireless communication system.

The wireless device 1202 may include one or more processor(s) 1204. The processor(s) 1204 may execute instructions such that various operations of the wireless device 1202 are performed, as described herein. The processor(s) 1204 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1202 may include a memory 1206. The memory 1206 may be a non-transitory computer-readable storage medium that stores instructions 1208 (which may include, for example, the instructions being executed by the processor(s) 1204). The instructions 1208 may also be referred to as program code or a computer program. The memory 1206 may also store data used by, and results computed by, the processor(s) 1204.

The wireless device 1202 may include one or more transceiver(s) 1210 that may include radio frequency (RF) transmitter and/or receiver circuitry that use the antenna(s) 1212 of the wireless device 1202 to facilitate signaling (e.g., the signaling 1232) to and/or from the wireless device 1202 with other devices (e.g., the network device 1218) according to corresponding RATs.

The wireless device 1202 may include one or more antenna(s) 1212 (e.g., one, two, four, or more). For embodiments with multiple antenna(s) 1212, the wireless device 1202 may leverage the spatial diversity of such multiple antenna(s) 1212 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1202 may be accomplished according to precoding (or digital beamforming) that is applied at the wireless device 1202 that multiplexes the data streams across the antenna(s) 1212 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 1202 may implement analog beamforming techniques, whereby phases of the signals sent by the antenna(s) 1212 are relatively adjusted such that the (joint) transmission of the antenna(s) 1212 can be directed (this is sometimes referred to as beam steering).

The wireless device 1202 may include one or more interface(s) 1214. The interface(s) 1214 may be used to provide input to or output from the wireless device 1202. For example, a wireless device 1202 that is a UE may include interface(s) 1214 such as microphones, speakers, a touch-screen, buttons, and the like in order to allow for input and/or output to the UE by a user of the UE. Other interfaces of such a UE may be made up of transmitters, receivers, and other circuitry (e.g., other than the transceiver(s) 1210/antenna(s) 1212 already described) that allow for communication between the UE and other devices and may operate according to known protocols (e.g., Wi-Fi®, Bluetooth®, and the like).

The wireless device 1202 may include a DSDA module 1216. The DSDA module 1216 may be implemented via hardware, software, or combinations thereof. For example, the DSDA module 1216 may be implemented as a processor, circuit, and/or instructions 1208 stored in the memory 1206 and executed by the processor(s) 1204. In some examples, the DSDA module 1216 may be integrated within the processor(s) 1204 and/or the transceiver(s) 1210. For example, the DSDA module 1216 may be implemented by a combination of software components (e.g., executed by a DSP or a general processor) and hardware components (e.g., logic gates and circuitry) within the processor(s) 1204 or the transceiver(s) 1210.

The DSDA module 1216 may be used for various aspects of the present disclosure, for example, aspects of FIG. 1 through FIG. 10. The DSDA module 1216 may be configured to implement a modified skipUplinkTxDynamic feature at the wireless device 1202 as described herein, regulate data subscriber transmissions at the wireless device 1202 as described herein, reduce transmissions on a voice subscriber of the wireless device 1202 as described herein, and/or operate each of a data subscriber and a voice subscriber of the wireless device 1202 in the same cell as described herein.

The network device 1218 may include one or more processor(s) 1220. The processor(s) 1220 may execute instructions such that various operations of the network device 1218 are performed, as described herein. The processor(s) 1220 may include one of more baseband processors implemented using, for example, a CPU, a DSP, an ASIC, a controller, an FPGA device, another hardware device, a firmware device, or any combination thereof configured to perform the operations described herein.

The network device 1218 may include a memory 1222. The memory 1222 may be a non-transitory computer-readable storage medium that stores instructions 1224 (which may include, for example, the instructions being executed by the processor(s) 1220). The instructions 1224 may also be referred to as program code or a computer program. The memory 1222 may also store data used by, and results computed by, the processor(s) 1220.

The network device 1218 may include one or more transceiver(s) 1226 that may include RF transmitter and/or receiver circuitry that use the antenna(s) 1228 of the network device 1218 to facilitate signaling (e.g., the signaling 1232) to and/or from the network device 1218 with other devices (e.g., the wireless device 1202) according to corresponding RATS.

The network device 1218 may include one or more antenna(s) 1228 (e.g., one, two, four, or more). In embodiments having multiple antenna(s) 1228, the network device 1218 may perform MIMO, digital beamforming, analog beamforming, beam steering, etc., as has been described.

The network device 1218 may include one or more interface(s) 1230. The interface(s) 1230 may be used to provide input to or output from the network device 1218. For example, a network device 1218 that is a base station may include interface(s) 1230) made up of transmitters, receivers, and other circuitry (e.g., other than the transceiver(s) 1226/antenna(s) 1228 already described) that enables the base station to communicate with other equipment in a core network, and/or that enables the base station to communicate with external networks, computers, databases, and the like for purposes of operations, administration, and maintenance of the base station or other equipment operably connected thereto.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE) implementing a dual subscriber identity module (SIM) dual active (DSDA) mode, comprising:
   determining that first transmission data of a first subscriber of the UE collides with second transmission data of a second subscriber of the UE, wherein the UE determines that the first transmission data collides with the second transmission data due to a period for radio frequency (RF) tuning from first frequency resources for the first transmission data to second frequency resources for the second transmission data that overlaps a slot for the second transmission data;

based on the determining that the first transmission data of the first subscriber of the UE collides with the second transmission data of the second subscriber of the UE:
   buffering the second transmission data; and
   sending, to a base station, a scheduling request for the second transmission data;
sending the first transmission data;
receiving, from the base station, a UL grant that occurs after the first transmission data is sent; and
sending the second transmission data using the UL grant.

2. The method of claim 1, wherein the first transmission data collides with the second transmission data during a prioritized period for the first subscriber.

3. The method of claim 1, wherein the first transmission data is for a first cell and the second transmission data is for a second cell, and wherein the UE further determines that the first transmission data collides with the second transmission data due to a slot timing difference between the first cell and the second cell at the UE that causes the first slot on the first cell to overlap the second slot on the second cell.

4. The method of claim 3, wherein the first transmission data comprises a sounding reference signal (SRS).

5. The method of claim 1, wherein the first subscriber is a voice subscriber and the second subscriber is a data subscriber.

6. The method of claim 1, further comprising determining that a UL transmission skipping parameter is configured to the UE.

7. The method of claim 1, wherein the scheduling request is sent to the base station without waiting for an expiry of a buffer status report (BSR) timer.

8. A user equipment (UE) implementing a dual subscriber identity module (SIM) dual active (DSDA) mode comprising:
   one or more processors; and
   a memory storing instructions that, when executed by the one or more processors, configure the UE to:
      determine that first transmission data of a first subscriber of the UE collides with second transmission data of a second subscriber of the UE, wherein the UE determines that the first transmission data collides with the second transmission data due to a period for radio frequency (RF) tuning from first frequency resources for the first transmission data to second frequency resources for the second transmission data that overlaps a slot for the second transmission data;
      based on the determination that the first transmission data of the first subscriber of the UE collides with the second transmission data of the second subscriber of the UE:
      buffer the second transmission data; and
      send, to a base station, a scheduling request for the second transmission data;
   send the first transmission data;
   receive, from the base station, a UL grant that occurs after the first transmission data is sent; and
   send the second transmission data using the UL grant.

9. The UE of claim 8, wherein the first transmission data is for a first cell and the second transmission data is for a second cell, and wherein the UE further determines that the first transmission data collides with the second transmission data due to a slot timing difference between the first cell and the second cell at the UE that causes the first slot on the first cell to overlap the second slot on the second cell.

10. The UE of claim 8, wherein the scheduling request is sent to the base station without waiting for an expiry of a buffer status report (BSR) timer.

11. The UE of claim 8, wherein the first transmission data collides with the second transmission data during a prioritized period for the first subscriber.

12. The UE of claim 9, wherein the first transmission data comprises a sounding reference signal (SRS).

13. The UE of claim 8, wherein the first subscriber is a voice subscriber and the second subscriber is a data subscriber.

14. The UE of claim 8, wherein the instructions, when executed by the one or more processors, further configure the UE to determine that a UL transmission skipping parameter is configured to the UE.

15. A non-transitory computer-readable storage medium comprising instructions, that when executed by one or more processors of a user equipment (UE) implementing a dual subscriber identity module (SIM) dual active (DSDA) mode, cause the UE to:

determine that first transmission data of a first subscriber of the UE collides with second transmission data of a second subscriber of the UE, wherein the UE determines that the first transmission data collides with the second transmission data due to a period for radio frequency (RF) tuning from first frequency resources for the first transmission data to second frequency resources for the second transmission data that overlaps a slot for the second transmission data;

based on the determination that the first transmission data of the first subscriber of the UE collides with the second transmission data of the second subscriber of the UE:

buffer the second transmission data; and send, to a base station, a scheduling request for the second transmission data;

send the first transmission data;

receive, from the base station, a UL grant that occurs after the first transmission data is sent; and send the second transmission data using the UL grant.

16. The non-transitory computer-readable storage medium of claim 15, wherein the first transmission data is for a first cell and the second transmission data is for a second cell, and wherein the UE further determines that the first transmission data collides with the second transmission data due to a slot timing difference between the first cell and the second cell at the UE that causes the first slot on the first cell to overlap the second slot on the second cell.

17. The non-transitory computer-readable storage medium of claim 15, wherein the scheduling request is sent to the base station without waiting for an expiry of a buffer status report (BSR) timer.

18. The non-transitory computer-readable storage medium of claim 15, wherein the first transmission data collides with the second transmission data during a prioritized period for the first subscriber.

19. The non-transitory computer-readable storage medium of claim 16, wherein the first transmission data comprises a sounding reference signal (SRS).

20. The non-transitory computer-readable storage medium of claim 15, wherein the instructions, when executed by the one or more processors, further cause the UE to determine that a UL transmission skipping parameter is configured to the UE.

\* \* \* \* \*